(12) United States Patent
Nelson et al.

(10) Patent No.: US 11,348,481 B2
(45) Date of Patent: May 31, 2022

(54) SIMULATOR SYSTEMS AND METHODS

(71) Applicant: THE UNIVERSITY OF NORTH CAROLINA AT CHAPEL HILL, Chapel Hill, NC (US)

(72) Inventors: Jennifer Nelson, Chapel Hill, NC (US); Henry Paul Goodell, Raleigh, NC (US)

(73) Assignee: The University of North Carolina at Chapel Hill, Chapel Hill, NC (US)

(*) Notice: Subject to any disclaimer, the term of this patent is extended or adjusted under 35 U.S.C. 154(b) by 738 days.

(21) Appl. No.: 16/041,206

(22) Filed: Jul. 20, 2018

(65) Prior Publication Data

US 2019/0027064 A1   Jan. 24, 2019

Related U.S. Application Data

(63) Continuation of application No. PCT/US2017/014400, filed on Jan. 20, 2017.

(60) Provisional application No. 62/281,471, filed on Jan. 21, 2016.

(51) Int. Cl.
*G09B 23/30* (2006.01)

(52) U.S. Cl.
CPC .......... *G09B 23/30* (2013.01); *G09B 23/303* (2013.01)

(58) Field of Classification Search
CPC .... G09B 23/30; G09B 23/303; G09B 23/285; G09B 23/288
USPC ........................................ 434/267, 268, 272
See application file for complete search history.

(56) References Cited

U.S. PATENT DOCUMENTS

| 4,773,865 A | 9/1988 | Baldwin |
| 5,409,382 A * | 4/1995 | Donnelly ............... G09B 23/28 434/262 |
| 5,634,797 A | 6/1997 | Montgomery |
| 6,062,866 A | 5/2000 | Prom |
| 6,234,804 B1 * | 5/2001 | Yong .................... G09B 23/285 434/267 |
| 6,790,043 B2 * | 9/2004 | Aboud ................. G09B 23/303 434/262 |

(Continued)

FOREIGN PATENT DOCUMENTS

| CN | 2293098 Y | 9/1998 |
| GB | 1484251 A | 9/1977 |
| WO | WO 0051485 A2 | 9/2000 |

OTHER PUBLICATIONS

International Search Report and Written Opinion for Application No. PCT/US2017/014400 dated May 25, 2017.

(Continued)

*Primary Examiner* — Joseph B Baldori
(74) *Attorney, Agent, or Firm* — Jenkins, Wilson, Taylor & Hunt, P.A.

(57) ABSTRACT

Systems and methods for simulating the insertion of a device via cannulation include an external shell which is at least partially filled with a silicone material, a simulated venous flow path, a simulated arterial flow path, one or more pumps to provide fluid to these flow paths, and a visible atrium in fluid communication with the venous flow path. The venous and arterial flow paths are made of flexible and distensible tubing, which is at least partially embedded within the silicone material in cannulation regions, and which is configured to be pierced to allow for insertion of a device therein. The atrium comprises a translucent front wall to enable, before, during, or after insertion of the device, visible inspection inside of the atrium.

27 Claims, 21 Drawing Sheets

(56) References Cited

U.S. PATENT DOCUMENTS

| | | | | |
|---|---|---|---|---|
| 7,427,199 | B2* | 9/2008 | Sakezles | G09B 23/28 |
| | | | | 434/267 |
| 8,342,852 | B2* | 1/2013 | King | G09B 23/28 |
| | | | | 434/268 |
| 8,556,635 | B2* | 10/2013 | Toly | G09B 23/285 |
| | | | | 434/272 |
| 9,472,122 | B2* | 10/2016 | Sakezles | G09B 23/303 |
| 10,115,322 | B2* | 10/2018 | Parry, Jr | G09B 23/303 |
| 10,540,913 | B2* | 1/2020 | Kinsella | G09B 23/285 |
| 10,885,813 | B2* | 1/2021 | Krummenacher | G09B 23/32 |
| 2012/0288839 | A1* | 11/2012 | Crabtree | B65D 75/56 |
| | | | | 434/267 |
| 2013/0203032 | A1 | 8/2013 | Bardsley et al. | |
| 2013/0295541 | A1 | 11/2013 | Alkhatib et al. | |
| 2016/0140878 | A1* | 5/2016 | Fernandez | G09B 23/303 |
| | | | | 434/268 |
| 2017/0076635 | A1* | 3/2017 | Homich | G09B 23/303 |
| 2017/0193858 | A1* | 7/2017 | Segall | G09B 23/303 |
| 2019/0333413 | A1* | 10/2019 | Bauer | G09B 23/303 |
| 2020/0160753 | A1* | 5/2020 | Sadasivan | G09B 23/303 |

OTHER PUBLICATIONS

Limbs & Things Ltd., Chest Drain & Needle Decompression Trainer, User Guide, Part No. 065-969, Jul. 2012.

\* cited by examiner

SIMULATOR SYSTEMS AND METHODS

CROSS-REFERENCE TO RELATED APPLICATIONS

This application is a continuation of and claims priority to PCT/US2017/014400 filed Jan. 20, 2017, which claims the benefit of and priority to Provisional Patent Application Ser. No. 62/281,471, filed Jan. 21, 2016, the disclosures of which are incorporated herein by reference in their entirety.

TECHNICAL FIELD

The subject matter described herein relates generally to medical diagnostic training and simulation devices and associated systems and methods. More particularly, the subject matter described herein relates to simulators, simulator systems, and methods of use for training medical professionals in performing medical procedures on and in the heart and large veins and arteries of the neck, groin, abdomen, and chest involving the use of, for example, medical devices, catheters, sheaths, and devices of all kinds, which are configured to be inserted via cannulation.

BACKGROUND

The teaching of medical procedures involving remote placement of medical devices, catheters, sheaths, and other endovascular devices, is made difficult due to the risk of adverse complications from improperly performed procedures in a clinical or field setting and the inability to readily visualize the flow patterns and placement of the devices in the patient using traditional training methods and devices. There presently exists a need in training medical personnel (e.g., physicians) in performing medical procedures on and around the heart, which has been difficult to accomplish in the past due to these difficulties.

The need for medical training devices and the demand for quality control to ensure as realistic a simulation experience as possible necessitate a consequence-free training environment that allows physicians to hone their skills before entering an operating room, catheterization laboratory, battlefield, or other arena where acute and/or invasive therapies are needed. This is especially true for procedures involving manipulation of the heart and its associated vasculature due to the risk of severe adverse complications from imprecise manipulation of the heart and the vessels leading from it and to it, which can lead to severe complications, including death.

One feature lacking in any of the known existing training devices used in training medical professionals in performing such techniques is the ability to visualize and monitor the placement of medical devices inserted into, through, and/or around the heart, as well as the localized impact on blood flow velocities and patterns caused by the inserted devices, whether placed correctly or incorrectly. This limitation is addressed by the subject matter of this disclosure, specifically the ability to visualize the placement of percutaneous medical devices within the heart, as well as the flow patterns and velocities caused by the insertion of such devices.

SUMMARY

The subject matter herein discloses simulator training devices and methods capable of representing the insertion of various medical devices into and/or around the heart and monitoring the placement of such devices as well as visualizing the altered flow patterns and velocities associated with the insertion of such devices. The training device is designed to aid in training medical professionals concerning the proper insertion and placement of medical devices into and around the heart. The devices capable of being inserted for purposes of simulation include, for example, medical devices, perfusion cannulas, valves, catheters, electrodes, sheaths and any other suitable endovascular devices, such as a device inserted via a method of cannulation of blood vessels. The preceding list is provided for illustrative purposes and is non-exhaustive; as such, it is contemplated that the methods and devices disclosed herein may include other structures beyond those listed above.

According to one aspect, a peripheral cannulation simulator system is provided. The peripheral cannulation simulator system includes a shell comprising a removable chest plate; at least one reservoir filled with a fluid; at least one pump; a venous flow path in fluid communication with the at least one pump; an arterial flow path in fluid communication with the at least one pump; and an atrium having a translucent front wall and in fluid communication with at least the venous flow path.

According to yet another aspect, a method of simulating the insertion of a device via cannulation is provided. The method includes the steps of providing a peripheral cannulation simulator system, which has a shell comprising a removable chest plate, at least one reservoir filled with a fluid, at least one pump, a venous flow path in fluid communication with the at least one pump, an arterial flow path in fluid communication with the at least one pump, and an atrium which has a translucent front wall and is in fluid communication with at least the venous flow path; and inserting a device configured to be inserted via cannulation within the system.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

An example peripheral cannulation simulator disclosed and described herein can be generally in the form of a human neck, torso, and upper thigh, as well as pressurized tubing and one or more pumps with variable, controlled pressure to allow a user to insert a medical device, such as a device 128 configured to be inserted via cannulation, and preferably using the Seldinger technique very well known to those of skill in the art. Such medical devices may also include other peripherally-inserted medical device, including, for example, catheters, perfusion cannulas, percutaneous valves, and related sheaths and wires, into pulsatile blood vessels of the neck and groin. The example peripheral cannulation simulator can be in the form of an adult, a young child, or a human of any age therebetween. Furthermore, it is contemplated that the instant invention will also be applicable to be created in the form of animals for veterinary medical procedures, typically on large animals, such as horses. As discussed further hereinbelow for the human example embodiments, the flow paths representing the venous and/or arterial blood vessels comprise pliable, distensible tubing and can be made pulsatile by a pump connected to a network of various-sized pliable tubing. Two different types of tubing may be used to simulate the veins and the arteries of the simulator. The blood vessels may be partially or completely embedded in molded silicone in the neck and groin regions of the simulator, and may further be visualized using ultrasound guidance. The tubing used in the example embodiments described hereinbelow is a silicone material, but other suitable alternative materials may be used, as will be understood by those having skill in the art. Given the descriptions contained herein, it will be obvious to one of skill in the art that other embodiments may be possible as well.

Figure 1A:
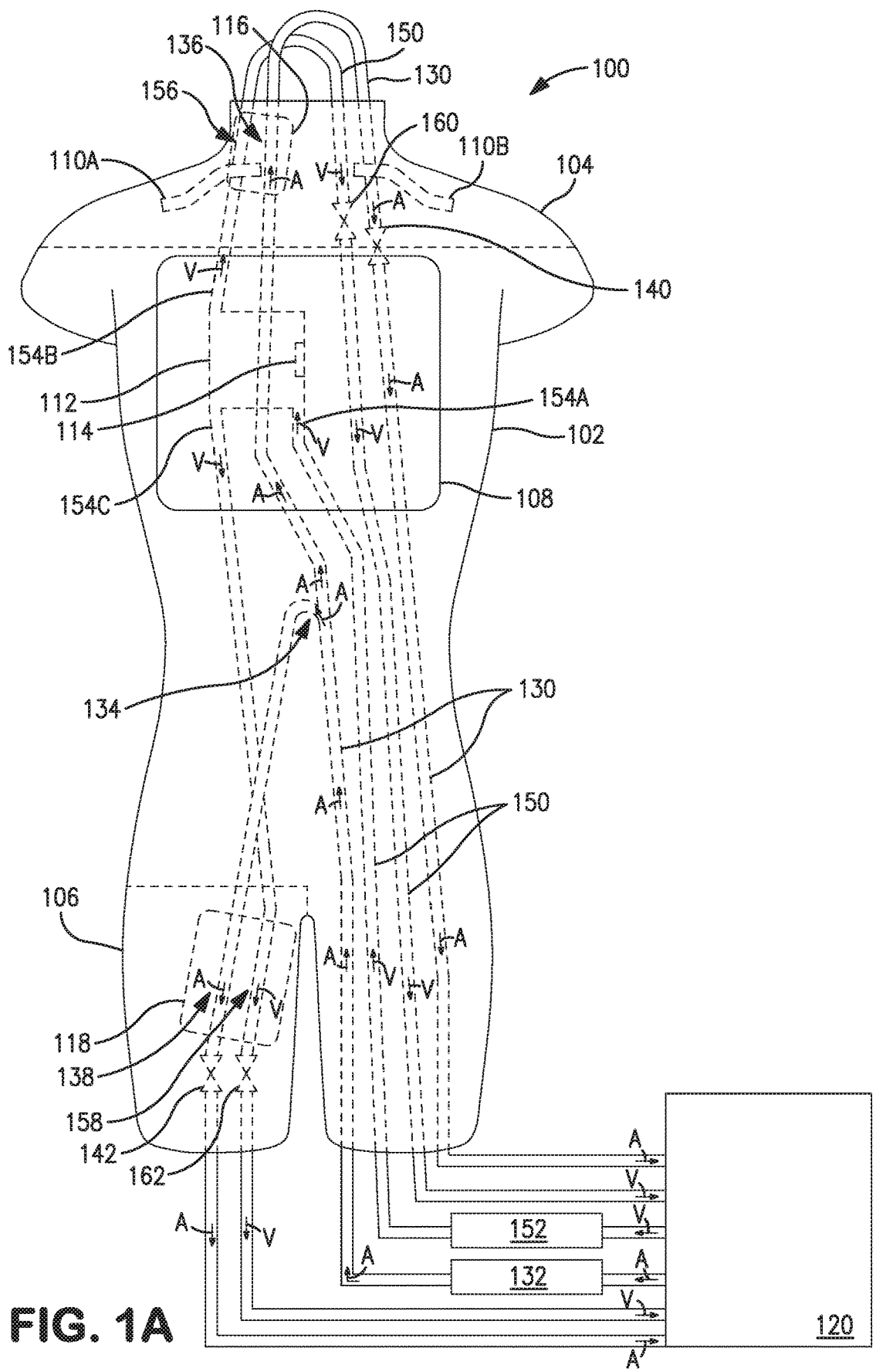
FIG. 1A is an external top plan view of a peripheral cannulation simulator system according to a first example embodiment, in accordance with the disclosure herein.
Figure 1B:
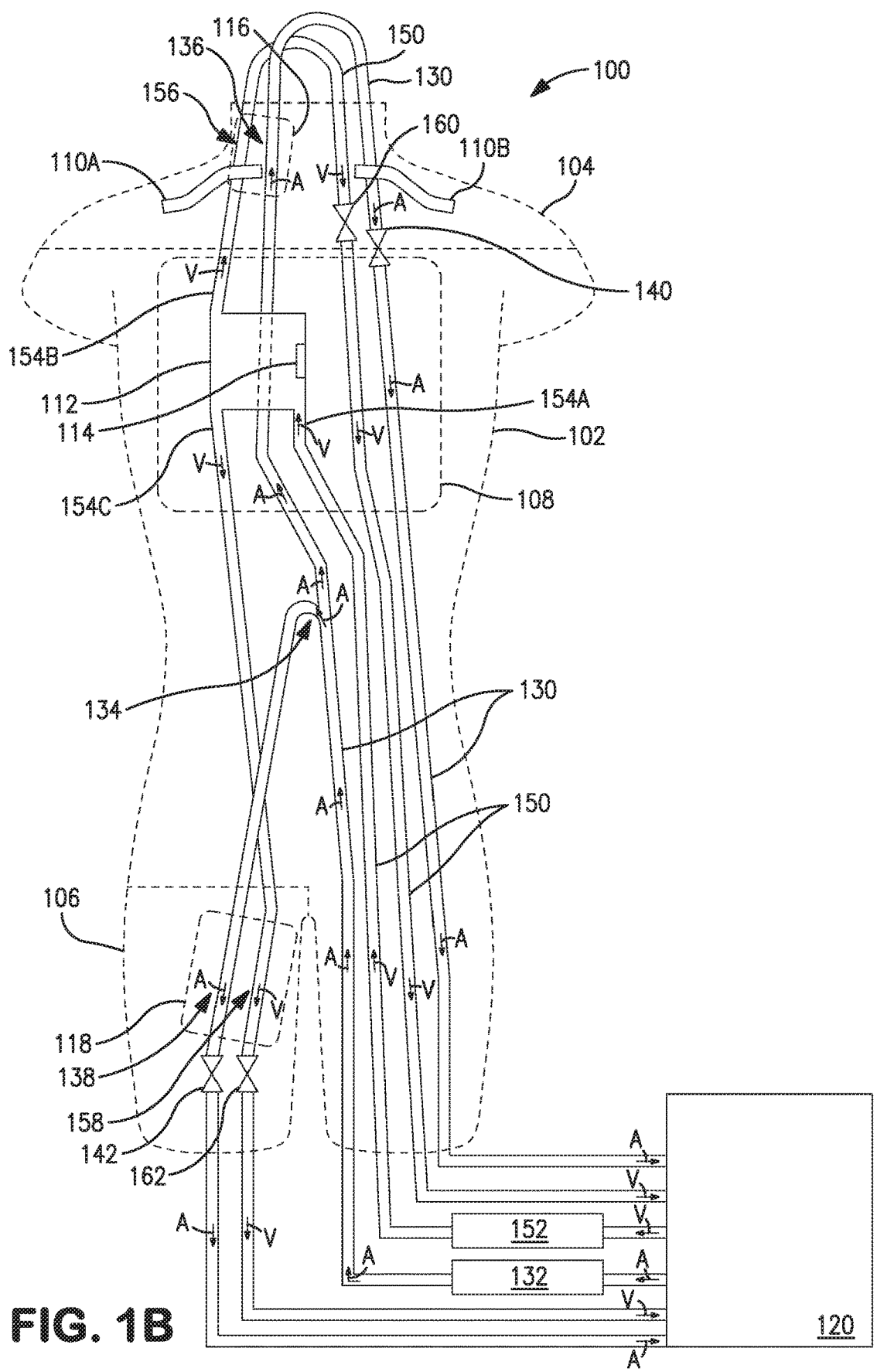
FIG. 1B is an internal top plan view of the peripheral cannulation simulator system of FIG. 1A, in accordance with the disclosure herein.

As is illustrated in FIGS. 1A and 1B, a first example embodiment of a peripheral cannulation simulation system, generally designated 100, includes a shell 102 with a removable chest plate 108 on a top surface thereof. FIG. 1A is an external top plan view of system 100, with the internal components thereof being illustrated in broken line. FIG. 1B is a view of system which illustrates the flow paths of the simulated vasculature of system 100 in solid lines, while the outer surfaces of system 100 (e.g., shell 102 and chest plate 108) are illustrated in solid lines. System 100 includes, within shell 102, molded portions in the form of upper torso 104 and right groin 106, both of which are substantially filled with a silicone material and have simulated vasculature structures, including arterial flow path 130 and venous flow path 150, embedded therein. The silicone material of upper torso 104 and right groin 106 are capable as serving as human skin analogues; as such, any other suitable material used in upper torso 104 and right groin 106 which is capable of serving as a suitable human skin analogue is within the scope of the present inventive subject matter. An outer surface of either or both of upper torso 104 and right groin 106 may be treated so as to appear to have suffered some level of traumatic injury (e.g., bruising, lacerations, burns, etc.).

Upper torso 104 includes, embedded therein, anatomically correct landmarks, including right and left clavicles 110A and 110B, under which the simulated vasculature passes in neck cannulation region 116, which is used for insertion of devices (e.g., 128) configured for insertion via cannulation into a simulated atrium 112 of a human heart by a simulated superior vena cava vasculature, accessible from internal jugular vein cannulation site 158, and which may or may not be marked on the outer surface of upper torso 104. Clavicles 110A and 110B are created from any suitable material, including molded plastic, and are embedded in anatomically correct locations under the surface of the simulated skin surface of upper torso 104; as such, clavicles 110A and 110B may be used by an operator of system 100 in locating neck cannulation region 116, when neck cannulation region 116 is not visibly marked. Clavicles 110A and 110B can be manufactured by 3D printing techniques known to those of ordinary skill in the art. In other embodiments, other anatomically correct landmarks can be embedded within upper torso 104 and/or right groin 106, including the iliac crest, and a pubic symphysis.

Right groin 106 has, on an outer surface thereof, femoral cannulation region 118, which is used for insertion of devices (e.g., 128) into atrium 112 by a simulated inferior vena cava vasculature, accessible from femoral vein cannulation site 156, and which may or may not be marked on the outer surface of right groin 106. The outer surface of shell 102 can be made at least partially from hard plastic material, yet other materials, including molded silicone throughout, could be used. While system 100 uses only the right groin 106 made out of silicone, both sides of the groin could be constructed in a proportional, mirror-image fashion. Molded silicone for the neck and/or groins may be dyed different colors and/or contoured to simulate burned or otherwise injured tissue for training military personnel in medical device placement and advanced resuscitation methods in the field.

According to this first embodiment, chest plate 108 may be either skin-colored or translucent, and is configured to create a space for viewing a visible atrium 112, as well as portions of arterial flow path 130 and venous flow path 150 inside the chest cavity. A purpose of allowing visualization of the inner structures of the simulator is to allow a user or instructor to see the position of the cannulae, other medical device(s), or the wires used to properly place them during operation and manipulation of system 100.

As was noted above, system 100 comprises both an arterial flow path 130 and a venous flow path 150, both of which are connected to reservoir 120, drawing and returning fluid (e.g., simulated blood) thereto as a closed system. It is preferred for the tubing comprising the arterial flow path 130 and the venous flow path 150 to be embedded within upper torso 104 and right groin 106 at a substantially anatomically accurate depth, thereby providing enhanced fidelity of the training simulator system 100.

Arterial flow path 130 of system 100 includes drawing fluid from reservoir 120 via arterial pump 132. Arterial pump 132 then pumps fluid through the simulated arterial flow path 130, entering shell 102 at the bottom of the left groin area and ascending in the direction of upper torso 104. Adjacent to a bottom edge of chest plate 108, arterial flow path 130 splits into two parallel flow paths at arterial bifurcation point 134. One bifurcated arterial flow path then descends to and is embedded within, at least partially, right groin 106, passing through femoral cannulation region, generally designated 118, which defines the location of femoral artery cannulation site, generally designated 138, through femoral artery return valve 142, which maintains a positive pressure within arterial flow path 130 in femoral cannulation region 118, and returns to reservoir 120. The other limb of the bifurcated arterial flow path 130 continues to ascend under chest plate 108, underneath atrium 112, and into upper torso 104, so as to be embedded therein. The portion of arterial flow path 130 embedded within upper torso 104 passes underneath right clavicle 110A, passes through neck cannulation region, generally designated 116, which defines carotid artery cannulation site, generally designated 136, then passes outside of the neck of shell 102, forming a general U-shape and entering shell 102, being embedded within upper torso 104 and passing underneath left clavicle 110B. While carotid artery return valve 140 is placed after the upper bifurcated portion of arterial flow path 130 re-enters shell 102, carotid artery return valve 140 may be placed at any suitable location after arterial flow path 130 passes through neck cannulation region 116. After passing through carotid artery return valve 140, the upper bifurcated portion of arterial flow path 130 descends through the left portion of shell 102, passing out therefrom via the left leg portion thereof and returning to reservoir 120. Carotid artery return valve 140 and femoral artery return valve 142 may be referred to collectively as "arterial valves."

Much like arterial flow path 130, venous flow path 150 utilizes a single supply line feeding fluid from reservoir 120 into venous pump 152. Fluid exits venous pump 152 and enters shell 102 via the left leg portion thereof, ascending to be visible underneath chest plate 108 and entering atrium 112 at atrium inlet port 154A. Venous flow path 150 then exits atrium 112 via upper atrium outlet port 154B and lower atrium outlet port 154C. As such, venous flow path 150 is connected to atrium 112 at a respective port thereof (e.g., 154A, 154B, or 154C). It is contemplated that further anatomically correct ports may be added without deviating from the scope of the invention described herein.

Venous flow which exits atrium 112 via upper atrium outlet port 154B ascends into upper torso 104 and is embedded therein so as to pass underneath right clavicle 110A and into neck cannulation region 116, which defines internal jugular vein cannulation site, generally designated 156, and passing external to shell 102 in a manner similar to that of arterial flow path 130, having a general U-shape and re-entering upper torso 104 and being embedded therein, passing beyond left clavicle 110B, through internal jugular vein return valve 160, and descending through shell 102, exiting through the left leg portion thereof, and returning to reservoir 120. Venous flow which exits atrium 112 via lower atrium outlet port 154C descends into right groin 106 and is embedded therein so as to pass through femoral cannulation region 118, which defines femoral vein cannulation site, generally designated 158, through femoral vein return valve 162, exiting shell 102 through the right leg portion thereof, and returning to reservoir 120. Internal jugular vein return valve 160 and femoral vein return valve 162 may be referred to collectively as "venous valves."

It should be noted that the respective locations of arterial flow path 130 and venous flow path 150 in neck cannulation region 116 and in femoral cannulation region 118 are substantially anatomically correct, in that venous flow path 150 is located so as to be closer to an external surface of shell compared to arterial flow path 130 in both neck cannulation region 116 and femoral cannulation region 118. Stated differently, venous flow path 150 and arterial flow path 130 are arranged at a depth simulating a typical anatomical position, having a typical artery-medial, vein-lateral in neck cannulation region 116, and artery-lateral, vein-medial in femoral cannulation region 118. Stated differently, the first portion of venous flow path 150, defined as the portion thereof which passes through neck cannulation region 116, is located in a lateral position, relative to the first portion of arterial flow path 130, which also passes through neck cannulation region 116; additionally, the second portion of venous flow path 150, defined as the portion thereof which passes through femoral cannulation region 118, is located in a medial position, relative to the second portion of arterial flow path 130, which also passes through femoral cannulation region 118. In some embodiments, arterial flow path 130 and/or venous flow path 150 in at least the neck cannulation region 116 and/or the femoral cannulation region 118 can be detected and identified via manual palpation by a user of the system. The specific locations of the cannulation regions can be altered based on physical non-conformities. The arrangement of portions of arterial flow path 130 and venous flow path 150 external to shell 102 are merely examples and it will be understood by persons having ordinary skill in the art that deviations therefrom will still be within the scope of the instant invention. Internal jugular vein and femoral vein return valves 160 and 162 are configured so as to provide a nominal positive pressure within venous flow path 150, thereby ensuring the possibility of substantially physiologically and anatomically correct distension thereof.

Where arterial flow path 130 and venous flow path 150 are connected to their respective pumps (e.g., arterial pump 132 and venous pump 152) and to reservoir 120, these connections are configured such that each can be disconnected from the respective pump or reservoir. Once disconnected, these connection points of arterial flow path 130 and/or venous flow path 150 can be connected to any suitable control system, which is configured to provide a suitable fluid flow. In some embodiments, this control system can have, for example, a separate fluid supply as well as various control algorithms which are stored in a memory and executed by a microprocessor. This will be described further hereinbelow, with respect to FIGS. 8A and 8B.

Furthermore, a clamp-like or other suitable resistance-adding device can be positioned on a portion of venous flow path 150 between venous pump 152 and the remainder of venous flow path 150 where the veins enter shell 102 to partially obstruct flow to venous flow path 150, thereby increasing the resistance on that side of system 100 to create a lower pressure within venous flow path 150 compared to arterial flow path 130. One-way valves directing flow direction of liquids may be associated with the arterial and venous flow paths 130 and 150.

Figure 2A:
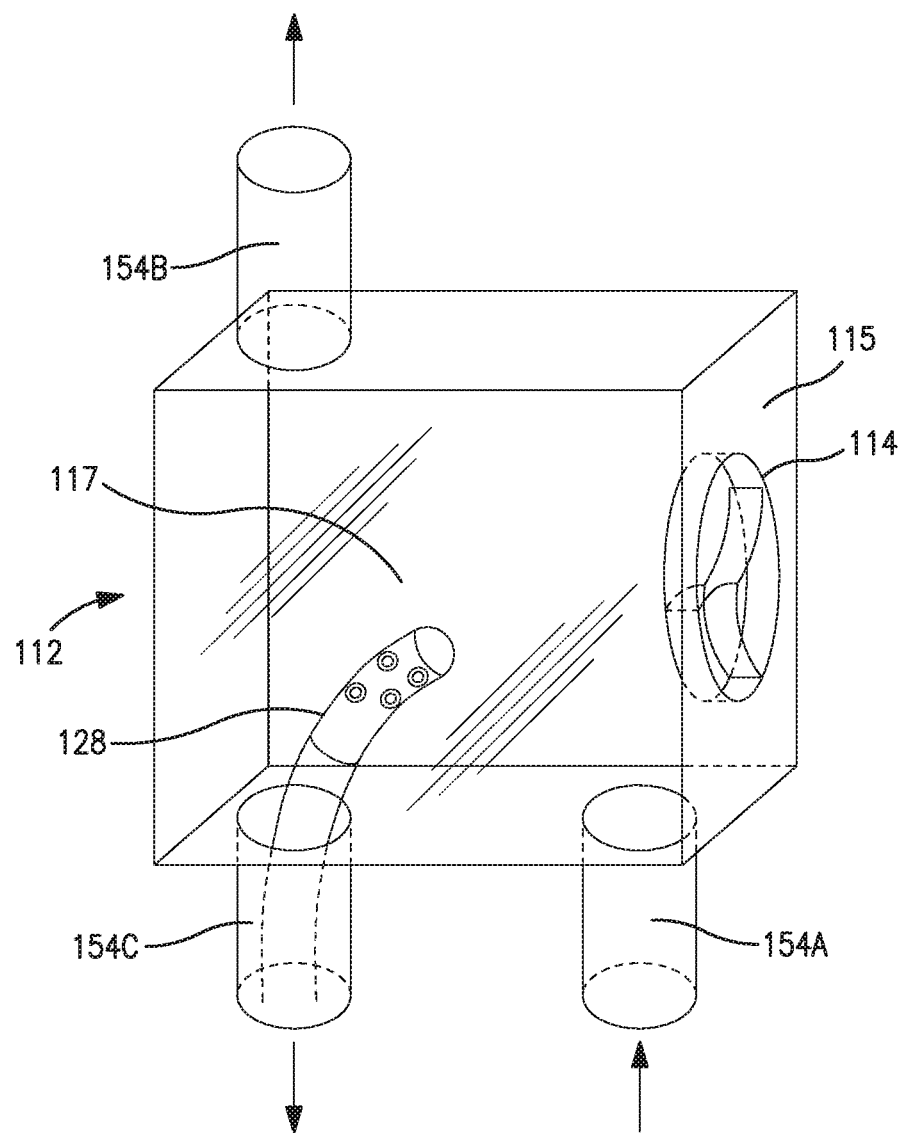
FIG. 2A is an orthographic side view of a first example embodiment of a visible atrium of the peripheral cannulation simulator system of FIGS. 1A and 1B, in accordance with the disclosure herein.

In FIG. 2A, a detailed illustration of an example embodiment of atrium 112 is shown, with a device 128 inserted therein via lower atrium outlet port 154C, however device 128 could also be inserted through upper and/or lower atrium outlet ports 154B and/or 154C of atrium 112. As was noted above, device 128 is configured for insertion via cannulation, and preferably via cannulation using the Seldinger technique. Atrium 112 is in the shape of a rectangular prism, with front surface 117 of atrium 112 having a generally square shape and being substantially flat and translucent, so as to enable visualization of the insertion and manipulation of medical devices (e.g., device 128) by operators and/or training personnel operating system 100. While front surface 117 of atrium 122 may have any suitable surface texture and shape, including non-flat surfaces, it is contemplated that a flat translucent front surface 117 is preferred, thereby avoiding distortion of the visible portions of atrium 112 which may be caused by a non-flat shape or surface of front surface 117 of atrium 112. As can be seen, atrium inlet port 154A is located in the bottom right corner of atrium 112, while upper atrium outlet port 154B and lower atrium outlet port 154C are disposed on upper left and lower left corners of atrium 112, respectively. It is noted that a simulated tricuspid valve 114 is disposed on the left wall 115 of atrium 112, tricuspid valve 104 being included so as to serve as a visual landmark within atrium 112 that may be recognized by the operator of system 100.

Figure 2B:
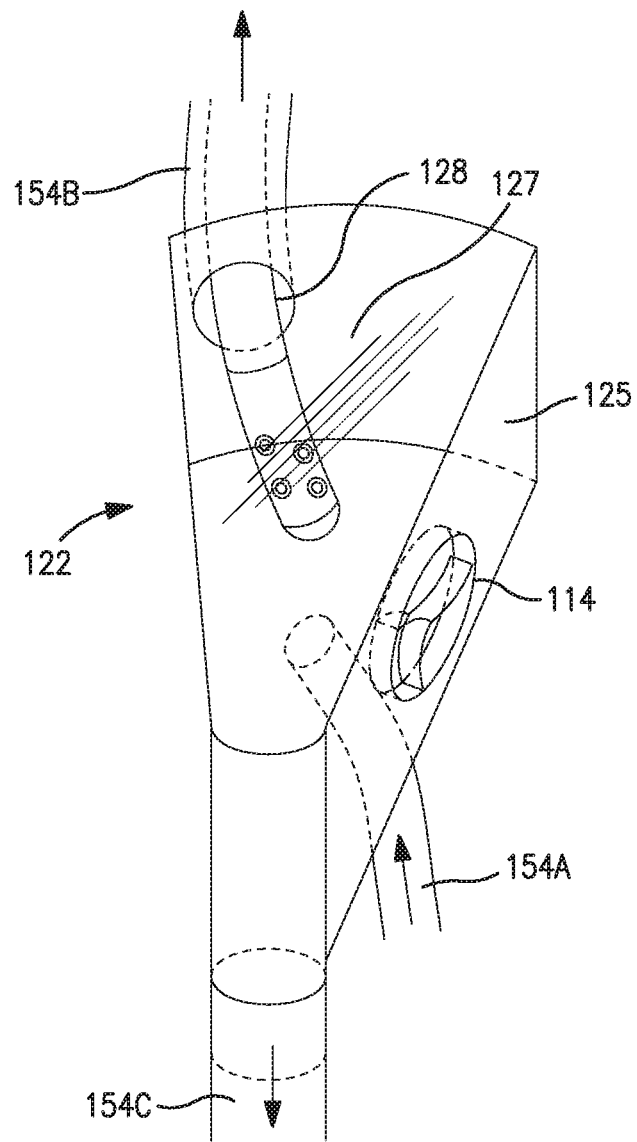
FIG. 2B is a perspective side view of a second example embodiment of a visible atrium of the peripheral cannulation simulator system of FIGS. 1A and 1B, in accordance with the disclosure herein.

FIG. 2B is an alternate embodiment of an atrium, generally designated 122, which is generally in the shape of a triangular prism, so as to more closely match the shape of the anatomically correct shape right atrium. Here, it is illustrated that device 128 can be inserted into atrium 122 via upper atrium outlet port 154B, however device 128 could also be inserted through upper and/or lower atrium outlet ports 154B and/or 154C of atrium 122. As was true of atrium 112 of FIG. 2A, atrium 122 has upper and lower atrium outlet ports 154B and 154C, respectively, in substantially the same positions as was described in FIG. 2A. Tricuspid valve 114 is disposed on a side wall 125 of atrium 122, while atrium inlet port 154A is disposed on a back surface of atrium 122. Just as was described for atrium 112 in FIG. 2A, atrium 122 has a front wall 127, which is preferably flat and translucent, thereby allowing easy visualization of flow patterns within atrium 122, both with and without device 128 being inserted therein.

Figure 2C:
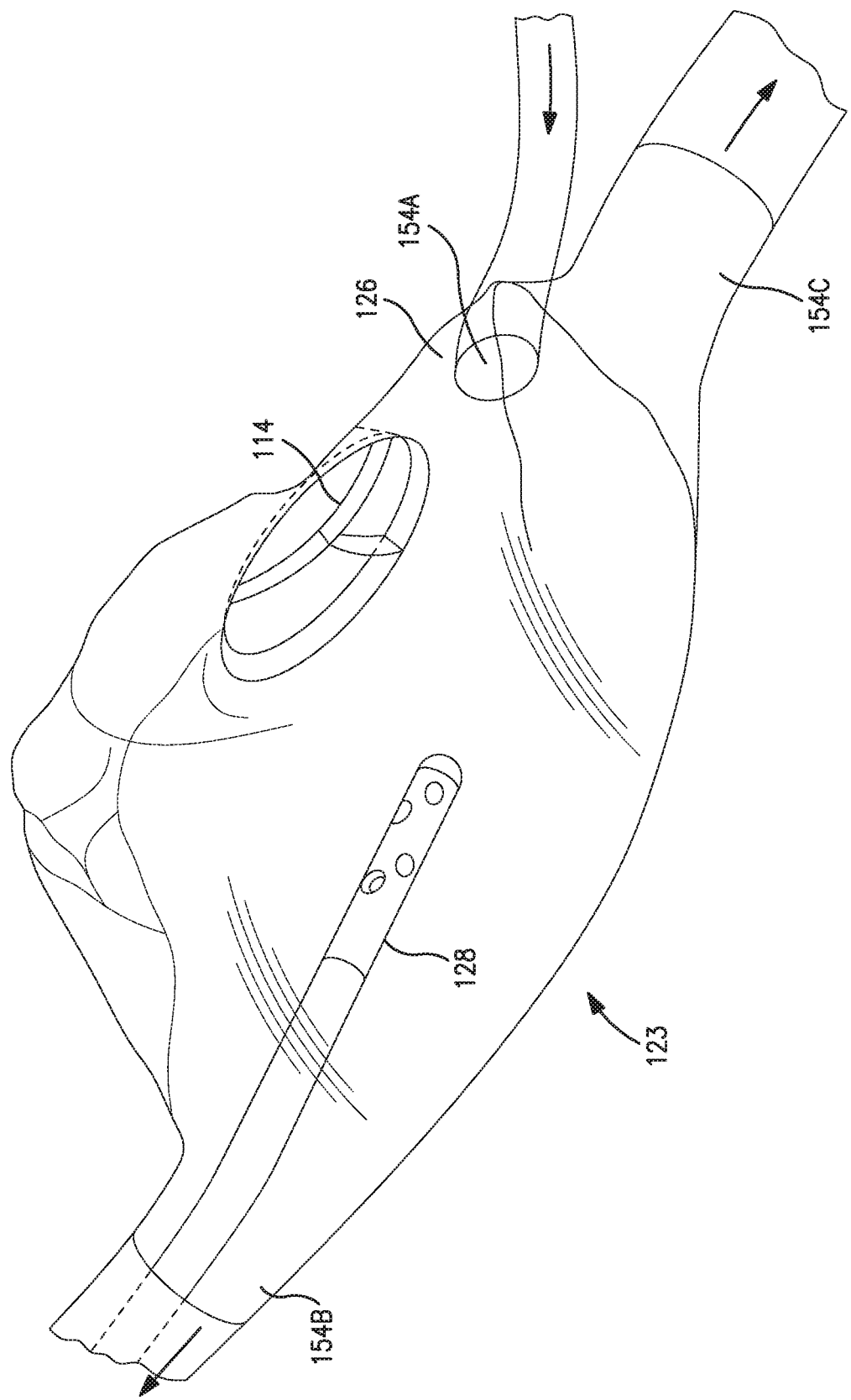
FIG. 2C is a perspective side view of a third example embodiment of a visible atrium of the peripheral cannulation simulator system of FIGS. 1A and 1B, in accordance with the disclosure herein.

FIG. 2C is another alternate embodiment of an atrium, generally designated 123 which is substantially in the shape of an anatomically correct human right atrium, and which can be produced by any suitable assembly method, including by 3D printing methods. As was true of atrium 112 of FIG. 2A, atrium 123 has upper and lower atrium outlet ports 154B and 154C, respectively, in substantially the same positions as was described in FIG. 2A. It is shown that device 128 is inserted into atrium 128 via upper atrium outlet port 154B, however device 128 could also be inserted through any of the ports (e.g., 154A, 154B, and/or 154C) of atrium 123. Tricuspid valve 114 is disposed on a left wall 126 of atrium 123, while atrium inlet port 154A is disposed on a left wall 126 of atrium 123. Just as was described for atrium 112 in FIG. 2A, atrium 123 has an outer surface which is translucent, thereby allowing visualization of flow patterns within atrium 123, both with and without device 128 being inserted therein.

Figure 3A:
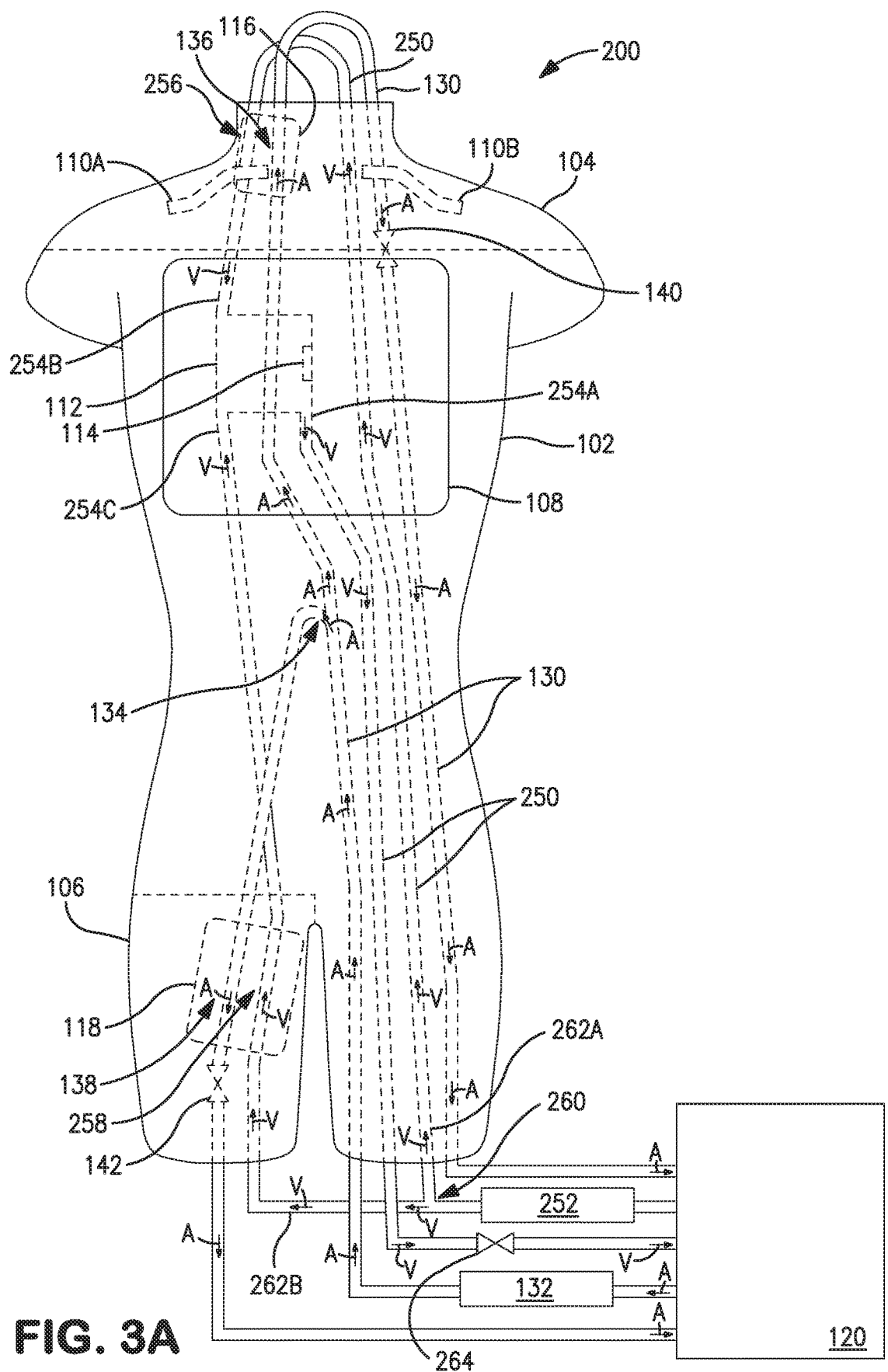
FIG. 3A is an external top plan view of a peripheral cannulation simulator system according to a second example embodiment, in accordance with the disclosure herein.
Figure 3B:
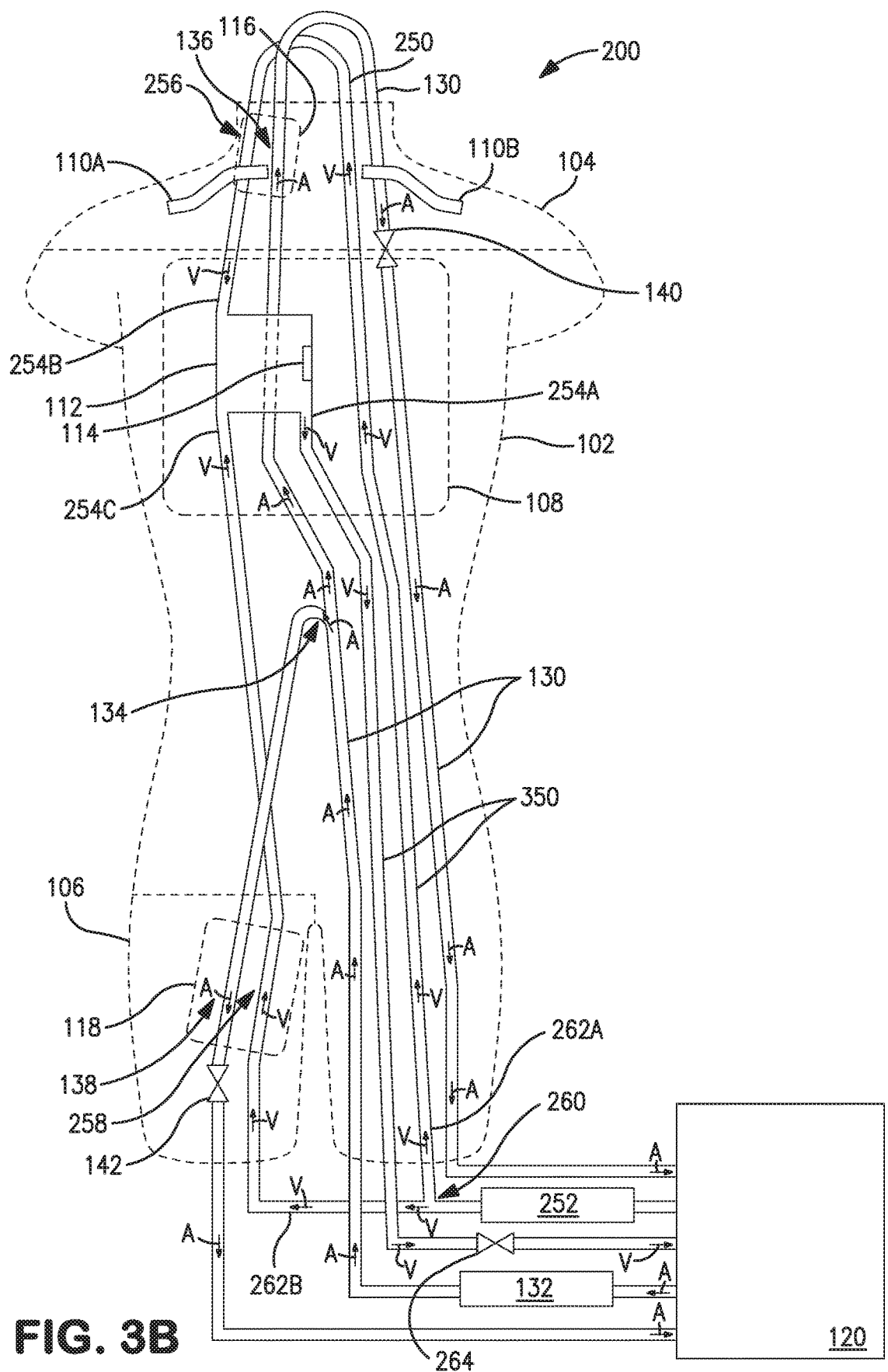
FIG. 3B is an internal top plan view of the peripheral cannulation simulator system of FIG. 3A, in accordance with the disclosure herein.

Referring now to FIGS. 3A and 3B, a second example embodiment of a cannulation simulator system, generally designated 200, is illustrated therein. FIG. 3A is an external top plan view of simulator system 200, with the external visible surfaces thereof being illustrated in solid lines, while the internal structures thereof are illustrated in broken lines. FIG. 3B is an internal view of simulator system 200, with the external surfaces within shell 102 being illustrated in broken line, while the internal portions and all flow structures are illustrated in solid line.

In the second example embodiment shown in both FIGS. 3A and 3B, system 200 has common structures which are substantially identical to those already described and illustrated in FIGS. 1A and 1B. Among these common structures are shell 102, upper torso 104, right groin 106, chest plate 108, right and left clavicles 110A and 110B, atrium 112, tricuspid valve 114, neck cannulation region 116, femoral cannulation region 118, reservoir 120, and arterial flow path 130. As such, arterial flow path 130 begins by drawing fluid from reservoir 120 into arterial pump 132, and into left leg cavity of shell 102, ascending to arterial bifurcation point 134, which is adjacent to a bottom edge of chest plate 108. At arterial bifurcation point 134, arterial flow path 130 splits into two parallel flow paths. One bifurcated arterial flow path then descends to and is embedded within, at least partially, right groin 106, passing through femoral cannulation region, generally designated 118, which defines the location of femoral artery cannulation site, generally designated 138, through femoral artery return valve 142, which maintains a positive pressure within arterial flow path 130 in femoral cannulation region 118, and returns to reservoir 120. The other bifurcated arterial flow path continues to ascend under chest plate 108, underneath atrium 112, and into upper torso 104, so as to be at least partially embedded therein. The portion of arterial flow path 130 embedded within upper torso 104 passes underneath right clavicle 110A, passes through neck cannulation region, generally designated 116, which defines carotid artery cannulation site, generally designated 136, then passes outside of the neck of shell 102, forming a general U-shape and entering shell 102, being embedded within upper torso 104 and passing underneath left clavicle 110B. While carotid artery return valve 140 is placed after the upper bifurcated portion of arterial flow path 130 re-enters shell 102, carotid artery return valve 140 may be placed at any suitable location after arterial flow path 130 passes through neck cannulation region 116. After passing through carotid artery return valve 140, the upper bifurcated portion of arterial flow path 130 descends through the left portion of shell 102, passing out therefrom via the left leg portion thereof and returning to reservoir 120.

System 200 includes a venous flow path 250 with a flow direction opposite to venous flow path 150 of system 100. As such, fluid flows into venous pump 252 from reservoir 120, then splits into parallel venous flow paths at venous bifurcation point 260. A first venous flow path enters shell 102 via the left leg portion thereof and ascends through shell under chest plate 108, into upper torso 104, so as to be embedded therein and pass beyond left clavicle 110B, out of the neck portion of shell, making a turn having a shape generally similar to a "U", and re-entering upper torso so as to pass through neck cannulation region 116, which thereby defines internal jugular vein cannulation site 256. The portion of venous flow path 250 at internal jugular vein cannulation site 256 is located closer to the external surface of upper torso 104 than the portion of arterial flow path 130 located at carotid artery cannulation site 136. The portion of venous flow path 250 at internal jugular vein cannulation site 256 passes underneath right clavicle 110A, and descends to enter atrium 112 at upper atrium inlet port 254B. A second venous flow path enters shell 102 at the lower end of right groin 106, being embedded therein and located closer to the external surface of right groin 106 than the portion of arterial flow path 130 located at femoral artery cannulation site 138. Stated differently, venous flow path 250 and arterial flow path 130 are arranged at a depth simulating a typical anatomical position, having a typical artery-medial, vein-lateral in neck cannulation region 116, and artery-lateral, vein medial in femoral cannulation region 118. This second venous flow path then passes through femoral cannulation region 118, which defines femoral vein cannulation site 258, and continues to ascend through shell 102 to enter atrium 112 via lower atrium inlet port 254C. Upper and lower atrium inlet ports 254B and 254C then mix in atrium 112, and exit atrium 112 via atrium outlet port 254A, descending out of shell 102, passing through venous return valve 264 (e.g., another embodiment of a "venous valve"), which is configured to maintain a positive nominal pressure within venous flow path 250, and flow back into reservoir 120.

FIGS. 3A-3C are substantially similar in structure to those shown in FIGS. 2A-2C, respectively, however the flow directions are reversed. As can be seen in FIGS. 3A-3C, fluid enters atriums 112, 122, and 123 at upper and lower atrium inlet ports 254B and 254C. This fluid then exits via atrium outlet port 254A. The front surface of each of atriums 112, 122, and 123 are translucent, thereby allowing for easy visualization of the flow patterns and velocities within the respective atriums.

Figure 4A:
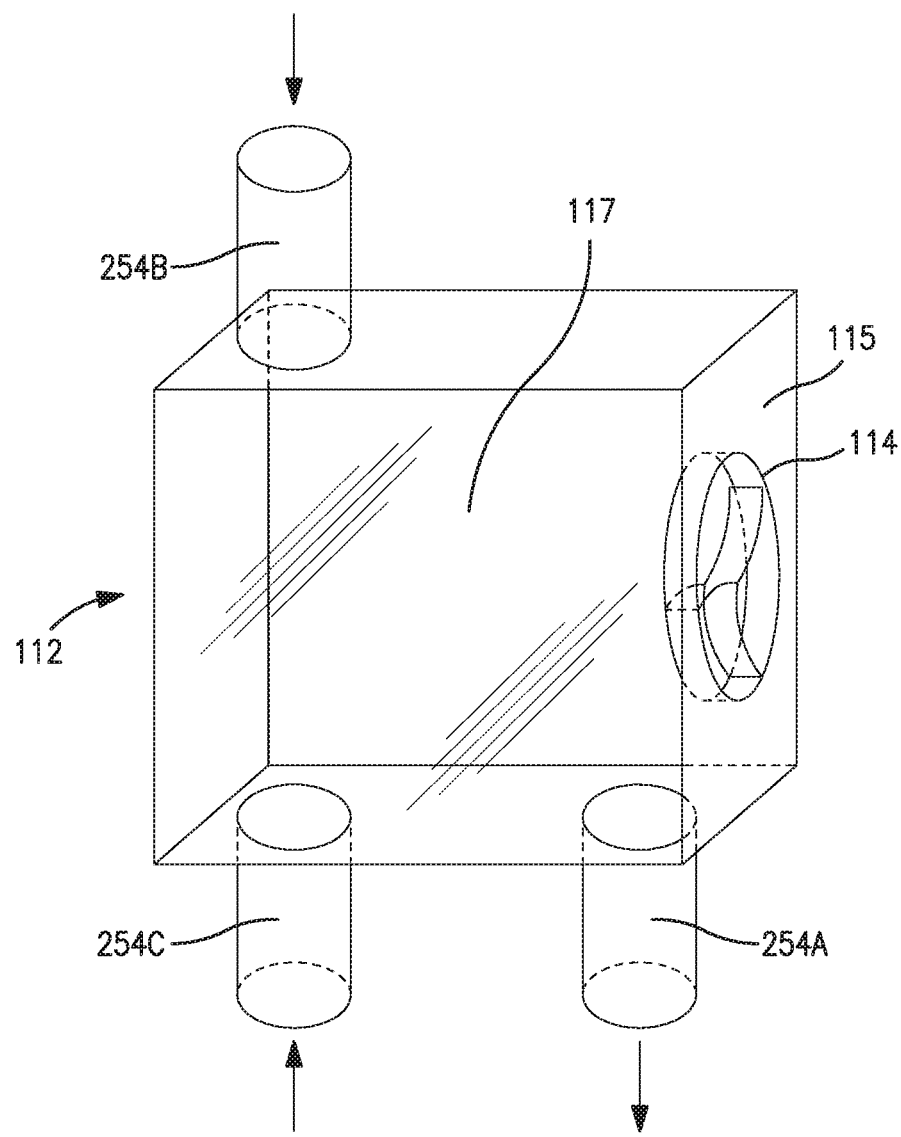
FIG. 4A is an orthographic side view of a first example embodiment of a visible atrium of the peripheral cannulation simulator system of FIGS. 3A and 3B, in accordance with the disclosure herein.

In FIG. 4A, a detailed illustration of an example embodiment of atrium 112 is shown, but having the flow pattern and port naming convention illustrated in system 200 of FIGS. 3A and 3B. Atrium 112 in FIG. 4A is otherwise identical to atrium 112 of FIG. 2A, being shaped as a rectangular prism, with front surface 117 of atrium 112 having a generally square shape and being substantially flat and translucent, so as to enable visualization of the insertion and manipulation of devices (e.g., 128) configured to be inserted via cannulation or other medical devices by operators and/or training personnel operating system 200. While front surface 117 of atrium 122 may have any suitable surface texture and shape, including non-flat surfaces, it is contemplated that a flat translucent front surface 117 is preferred, thereby avoiding distortion of the visible portions of atrium 112 which may be caused by a non-flat shape or surface of front surface 117 of atrium 112. As can be seen, atrium outlet port 254A is located in the bottom right corner of atrium 112, while upper atrium inlet port 254B and lower atrium inlet port 254C are disposed on upper left and lower left corners of atrium 112, respectively. It is noted that a simulated tricuspid valve 114 is disposed on the left wall 115 of atrium 112, the tricuspid valve being included so as to serve as a visual landmark for the operator of system 200. Just as is shown in FIG. 2A, a device (e.g., device 128) may be inserted into and through any of the respective ports (e.g., 154B and/or 154C) of atrium 112.

Figure 4B:
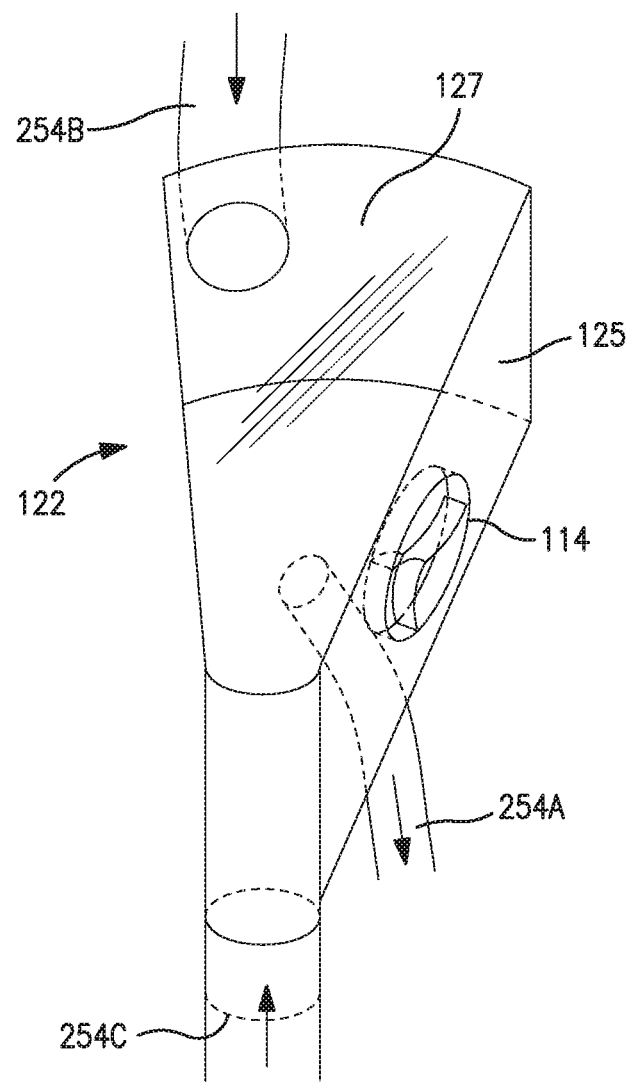
FIG. 4B is a perspective side view of a second example embodiment of a visible atrium of the peripheral cannulation simulator system of FIGS. 3A and 3B, in accordance with the disclosure herein.
Figure 4C:
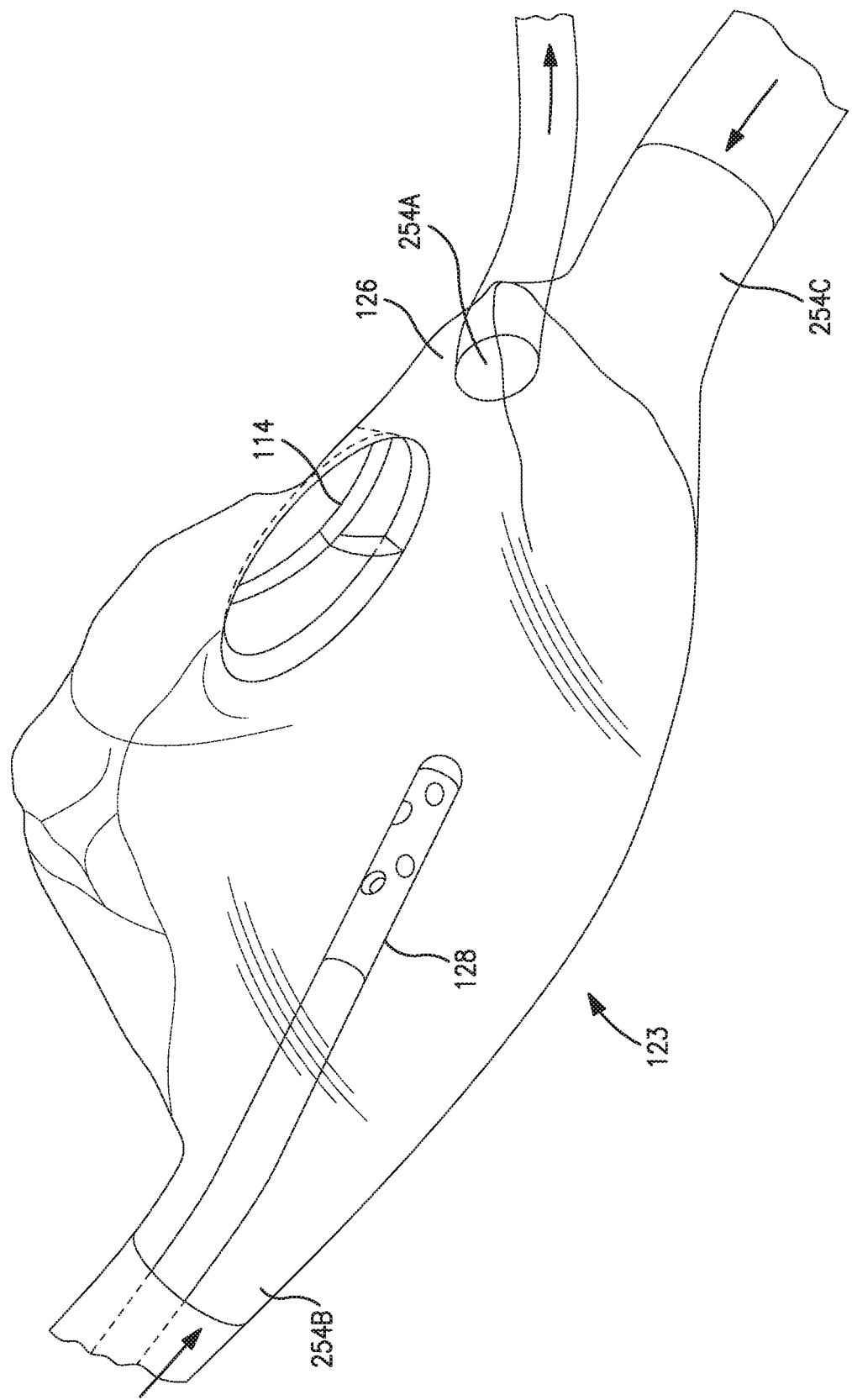
FIG. 4C is a perspective side view of a third example embodiment of a visible atrium of the peripheral cannulation simulator system of FIGS. 3A and 3B, in accordance with the disclosure herein.

FIG. 4B is an alternate embodiment of an atrium, generally designated 122, which is generally in the shape of a triangular prism, so as to more closely match the shape of the anatomically shaped atrium. Here, a detailed illustration of an example embodiment of atrium 122 is shown, but having the flow pattern and port naming convention illustrated in system 200 of FIGS. 3A and 3B. Atrium 122 in FIG. 4B is otherwise identical to atrium 122 of FIG. 2B, with atrium 122 having upper and lower atrium inlet ports 254B and 254C, respectively, in substantially the same positions as was described in FIG. 4B. Tricuspid valve 114 is disposed on a side wall 125 of atrium 122, while atrium outlet port 254A is disposed on a back surface of atrium 122. Just as was described for atrium 112 in FIG. 4A, atrium 122 has a front wall 127, which is preferably flat and translucent, thereby allowing easy visualization of flow velocities and patterns within atrium 122, both with and without device 128 being inserted therein.

FIG. 2C is another alternate embodiment of an atrium, generally designated 123 which is substantially in the shape of an anatomically correct atrium, and which can be produced by any suitable assembly method, including by 3D printing methods. As was true of atrium 112 of FIG. 4A, atrium 123 has upper and lower atrium inlet ports 254B and 254C, respectively, in substantially the same positions as was described in FIG. 4A. It is shown that device 128 is inserted into atrium 128 via upper atrium inlet port 254B, however device 128 could also be inserted through either of the upper and/or lower atrium inlet ports 254B and/or 254C of atrium 123. Tricuspid valve 114 is disposed on a left wall 126 of atrium 123, while atrium outlet port 254A is disposed on a back surface of atrium 123. Just as was described for atrium 112 in FIG. 4A, atrium 123 has an outer surface which is translucent, thereby allowing visualization of flow patterns within atrium 123, both with and without device 128 being inserted therein.

Figure 5A:
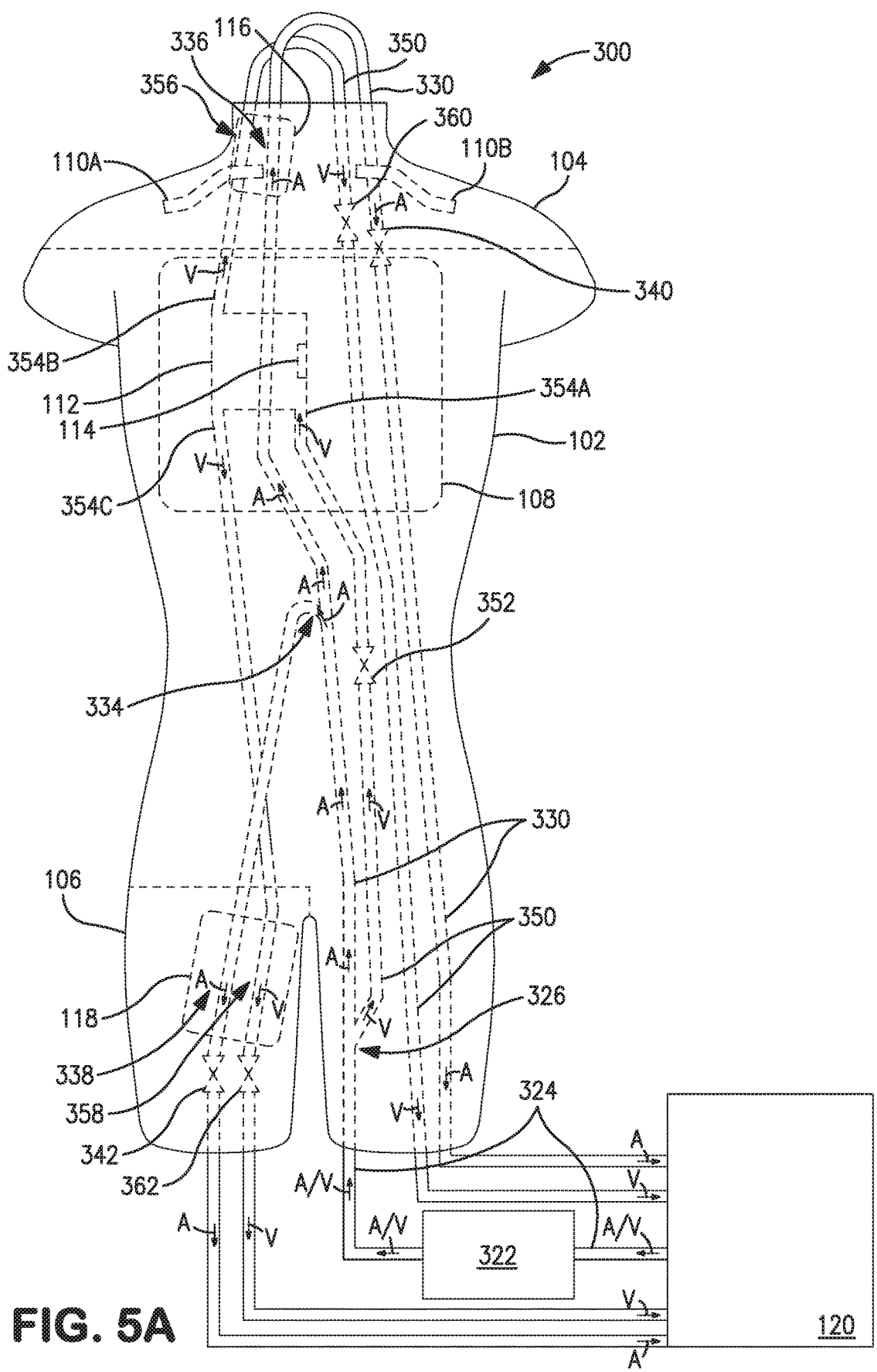
FIG. 5A is an external top plan view of a peripheral cannulation simulator system according to a third example embodiment, in accordance with the disclosure herein.
Figure 5B:
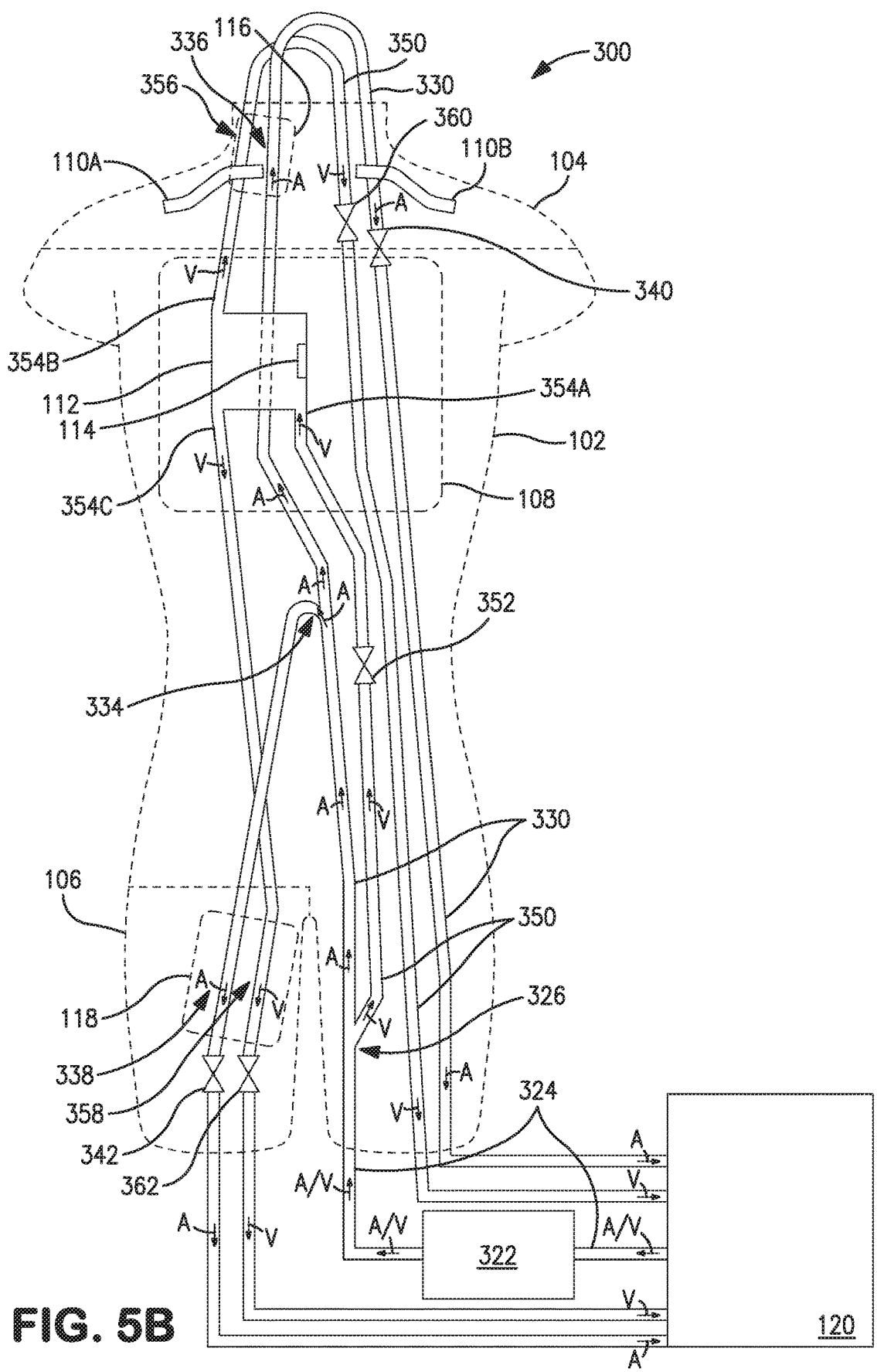
FIG. 5B is an internal top plan view of the peripheral cannulation simulator system of FIG. 5A, in accordance with the disclosure herein.

Continuing on to FIGS. 5A and 5B, a third example embodiment of a cannulation simulator system, generally designated 300, is illustrated therein. FIG. 5A is an external top plan view of simulator system 300, with the external visible surfaces thereof being illustrated in solid lines, while the internal structures thereof are illustrated in broken lines. FIG. 5B is an internal view of simulator system 300, with the external surfaces within shell 102 being illustrated in broken line, while the internal portions and all flow structures are illustrated in solid line.

In the third example embodiment shown in both FIGS. 5A and 5B, system 300 has common structures which are substantially identical to those already described and illustrated in FIGS. 1A and 1B. Among these common structures are shell 102, upper torso 104, right groin 106, chest plate 108, right and left clavicles 110A and 110B, atrium 112, tricuspid valve 114, neck cannulation region 116, femoral cannulation region 118, and reservoir 120. However, unlike in the first and second example embodiments described hereinabove, system 300 utilizes a common arterial/venous pump 322 and, at least in part, a common arterial/venous flow path 324. As such, fluid flows from reservoir 120 into common arterial/venous pump 322 via common arterial/venous flow path 324. The fluid then ascends into the left leg portion of shell 102. At arterial/venous bifurcation point 326, which is located in left leg, but which can be located elsewhere, including external to shell 102, arterial flow path 330 separates from venous flow path 350.

Arterial flow path 330, from arterial/venous bifurcation point 326 onward, is substantially identical to arterial flow path 130 of systems 100 and 200. As such, arterial flow path 330 ascends to arterial bifurcation point 334, which is adjacent to a bottom edge of chest plate 108. At arterial bifurcation point 334, arterial flow path 330 splits into two parallel flow paths. One bifurcated arterial flow path then descends to and is embedded within, at least partially, right groin 106, passing through femoral cannulation region, generally designated 118, which defines the location of femoral artery cannulation site, generally designated 338, through femoral artery return valve 342, which maintains a positive pressure within arterial flow path 330 in femoral cannulation region 118, and returns to reservoir 120. The other bifurcated arterial flow path continues to ascend under chest plate 108, underneath atrium 112, and into upper torso 104, so as to be at least partially embedded therein. The portion of arterial flow path 330 embedded within upper torso 104 passes underneath right clavicle 110A, passes through neck cannulation region, generally designated 116, which defines carotid artery cannulation site, generally designated 336, then passes outside of the neck of shell 102, forming a general U-shape and re-entering shell 102, being embedded within upper torso 104 and passing underneath left clavicle 110B. While carotid artery return valve 340 is placed after the upper bifurcated portion of arterial flow path 330 re-enters shell 102, carotid artery return valve 340 may be placed at any suitable location after arterial flow path 330 passes through neck cannulation region 116. After passing through carotid artery return valve 340, the upper bifurcated portion of arterial flow path 330 descends through the left portion of shell 102, passing out therefrom via the left leg portion thereof and returning to reservoir 120. Carotid artery return valve 340 and femoral artery return valve 342 may also be referred to collectively as "arterial valves."

Venous flow path 350, beyond arterial/venous bifurcation point 326, passes through venous pressure reducing valve 352 and ascends to be visible underneath chest plate 108 and enters atrium 112 at atrium inlet port 354A. Venous flow path 350 then exits atrium 112 via upper atrium outlet port 354B and lower atrium outlet port 354C. Venous flow which exits atrium 112 via upper atrium outlet port 354B ascends into upper torso 104 and is embedded therein so as to pass underneath right clavicle 110A and into neck cannulation region 116, which defines internal jugular vein cannulation site, generally designated 356, and passing external to shell 102 in a manner similar to that of arterial flow path 330, having a general U-shape and re-entering upper torso 104 and being embedded therein, passing beyond left clavicle 110B, through internal jugular vein return valve 360, and descending through shell 102, exiting through the left leg portion thereof, and returning to reservoir 120. Venous flow which exits atrium 112 via lower atrium outlet port 354C descends into right groin 106 and is embedded therein so as to pass through femoral cannulation region 118, which defines femoral vein cannulation site, generally designated 358, through femoral vein return valve 362, exiting shell 102 through the right leg portion thereof, and returning to reservoir 120. Venous flow path 350 and arterial flow path 330 are arranged at a depth simulating a typical anatomical position, having a typical artery-medial, vein-lateral in neck cannulation region 116, and artery-lateral, vein medial in femoral cannulation region 118. Venous pressure reducing valve 352, Internal jugular vein return valve 360, and femoral vein return valve 362 may also be referred to collectively as "venous valves."

Figure 6A:
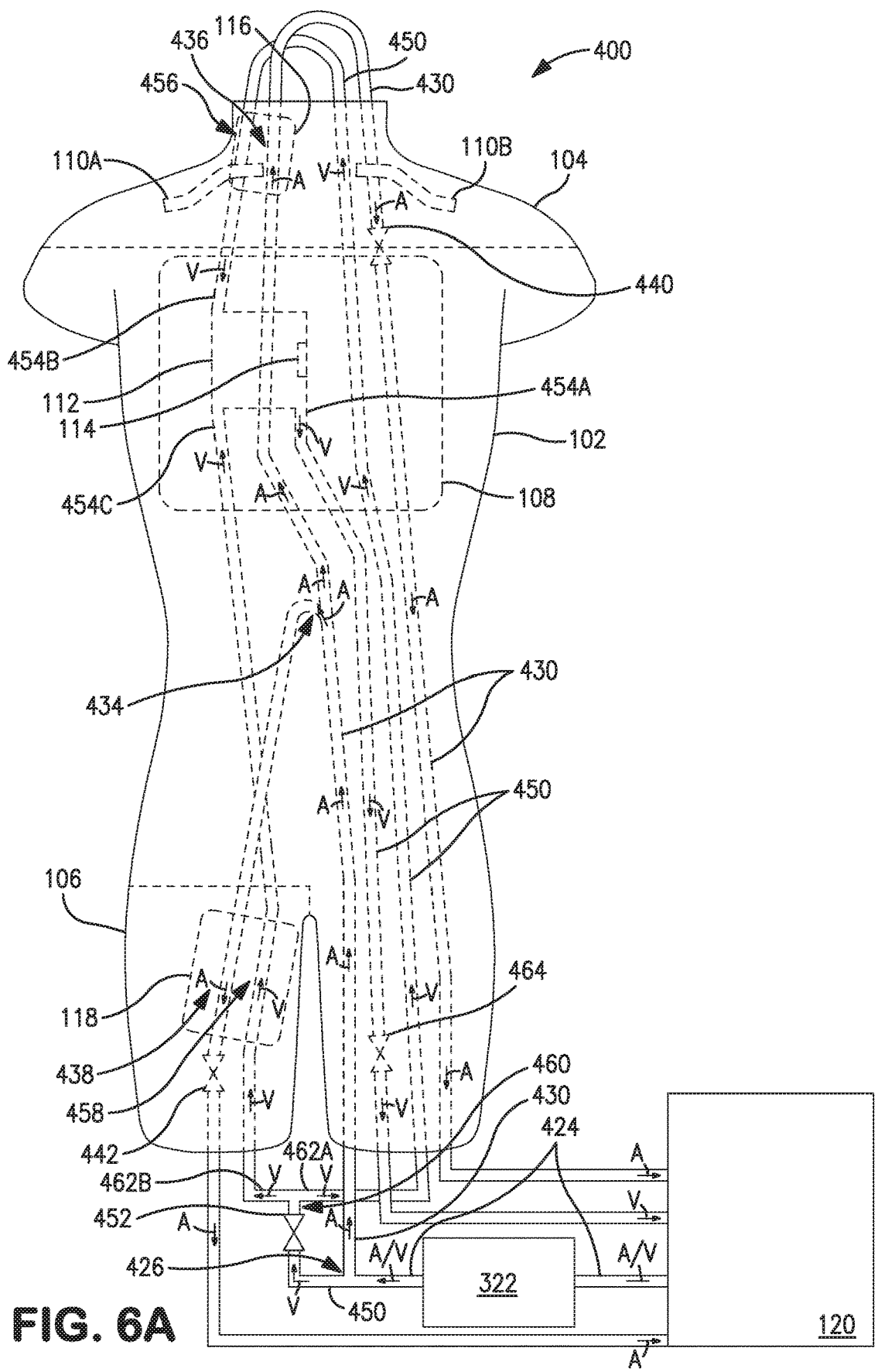
FIG. 6A is an external top plan view of a peripheral cannulation simulator system according to a fourth example embodiment, in accordance with the disclosure herein.
Figure 6B:
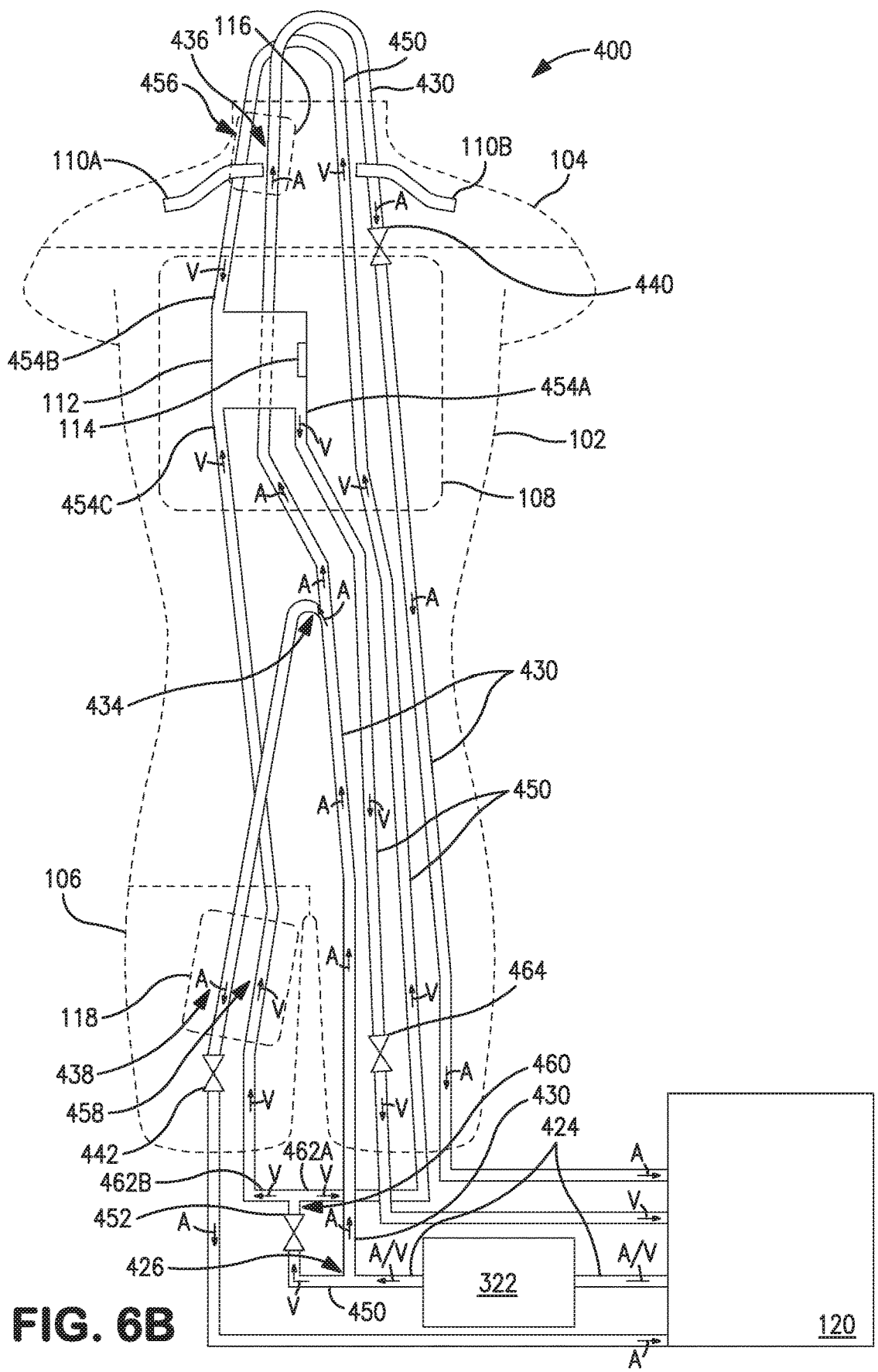
FIG. 6B is an internal top plan view of the peripheral cannulation simulator system of FIG. 6A, in accordance with the disclosure herein.

Now referring to FIGS. 6A and 6B, a fourth example embodiment of a cannulation simulator system, generally designated 400, is illustrated therein. FIG. 6A is an external top plan view of simulator system 400, with the external visible surfaces thereof being illustrated in solid lines, while the internal structures thereof are illustrated in broken lines. FIG. 6B is an internal view of simulator system 400, with the external surfaces within shell 102 being illustrated in broken line, while the internal portions and all flow structures are illustrated in solid line.

In the fourth example embodiment shown in both FIGS. 6A and 6B, system 400 has common structures which are substantially identical to those already described and illustrated in FIGS. 5A and 5B. Among these common structures are shell 102, upper torso 104, right groin 106, chest plate 108, right and left clavicles 110A and 110B, atrium 112, tricuspid valve 114, neck cannulation region 116, femoral cannulation region 118, reservoir 120, and common arterial/venous pump 322. However, venous flow path 450 has a reverse flow direction compared to venous flow path 350 of system 300. In order to accommodate the reverse flow direction of venous flow path 450, common arterial/venous flow path 424, after exiting common arterial/venous pump 322, reaches arterial/venous bifurcation point 426, which is illustrated as being external to shell 102. At arterial/venous bifurcation point 426, arterial flow path 430 separates from venous flow path 450.

Arterial flow path 430, from arterial/venous bifurcation point 426 onward, is substantially identical to arterial flow path 130 of systems 100 and 200. As such, arterial flow path 430 ascends to arterial bifurcation point 434, which is adjacent to a bottom edge of chest plate 108. At arterial bifurcation point 434, arterial flow path 430 splits into two parallel flow paths. One bifurcated arterial flow path then descends to and is embedded within, at least partially, right groin 106, passing through femoral cannulation region, generally designated 118, which defines the location of femoral artery cannulation site, generally designated 438, through femoral artery return valve 442, which maintains a positive pressure within arterial flow path 430 in femoral cannulation region 118, and returns to reservoir 120. The other bifurcated arterial flow path continues to ascend under chest plate 108, underneath atrium 112, and into upper torso 104, so as to be at least partially embedded therein. The portion of arterial flow path 430 embedded within upper torso 104 passes underneath right clavicle 110A, passes through neck cannulation region, generally designated 116, which defines carotid artery cannulation site, generally designated 436, then passes outside of the neck of shell 102, forming a general U-shape and re-entering shell 102, being embedded within upper torso 104 and passing underneath left clavicle 110B. While carotid artery return valve 440 is placed after the upper bifurcated portion of arterial flow path 430 re-enters shell 102, carotid artery return valve 440 may be placed at any suitable location after arterial flow path 430 passes through neck cannulation region 116. After passing through carotid artery return valve 440, the upper bifurcated portion of arterial flow path 430 descends through the left portion of shell 102, passing out therefrom via the left leg portion thereof and returning to reservoir 120. Carotid artery return valve 440 and femoral artery return valve 442 may also be referred to collectively as "arterial valves."

Venous flow path 450, beyond arterial/venous bifurcation point 426, passes through venous pressure reducing valve 452 and then splits into parallel venous flow paths 462A and 462B at venous bifurcation point, generally designated 460. A first venous flow path 462A enters shell 102 via the left leg portion thereof and ascends through shell under chest plate 108, into upper torso 104, so as to be embedded therein and pass beyond left clavicle 110B, out of the neck portion of shell, making a turn having a shape generally similar to a "U", and re-entering upper torso so as to pass through neck cannulation region 116, which thereby defines internal jugular vein cannulation site 456. The portion of venous flow path 450 at internal jugular vein cannulation site 456 is located closer to the external surface of upper torso 104 than the portion of arterial flow path 430 located at carotid artery cannulation site 436. The portion of venous flow path 450 at internal jugular vein cannulation site 456 passes underneath right clavicle 110A, and descends to enter atrium 112 at upper atrium inlet port 454B. A second venous flow path 462B enters shell 102 at the lower end of right groin 106, being embedded therein and located closer to the external surface of right groin 106 than the portion of arterial flow path 430 located at femoral artery cannulation site 438. Stated differently, venous flow path 250 and arterial flow path 130 are arranged at a depth simulating a typical anatomical position, having a typical artery-medial, vein-lateral in neck cannulation region 116, and artery-lateral, vein medial in femoral cannulation region 118. This second venous flow path then passes through femoral cannulation region 118, which defines femoral vein cannulation site 458, and continues to ascend through shell 102 to enter atrium 112 via lower atrium inlet port 454C. Upper and lower atrium inlet ports 454B and 454C then mix in atrium 112, and exit atrium 112 via atrium outlet port 454A, descending out of shell 102, passing through venous return valve 464, which is configured to maintain a positive nominal pressure within venous flow path 450, and flow back into reservoir 120. Venous pressure reducing valve 452 and venous return valve 462 may also be referred to collectively as "venous valves."

Regarding FIGS. 7A-7E, various pump configurations and controllers are illustrated therein.

Figure 7A:
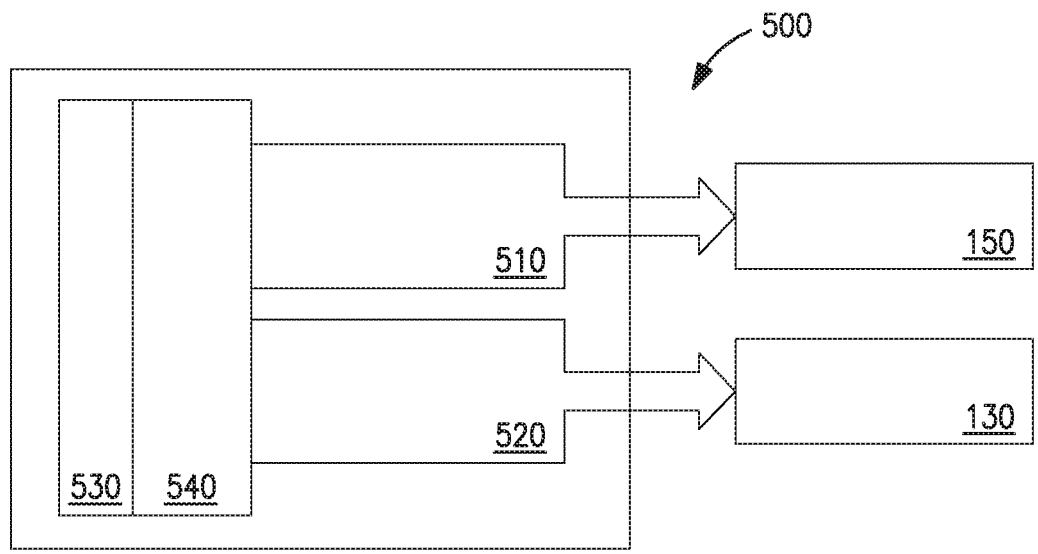
FIG. 7A is a schematic illustration of a first example embodiment of a pump control system for the peripheral cannulation simulator systems of FIGS. 1A and 1B, in accordance with the disclosure herein.

Specifically regarding FIG. 7A, pump control system 500 is illustrated, having user input controls 530 and a microcontroller regulator 540, both of which are connected to two pumps, centrifugal-type pump 510 and piston-type pump 520. User input controls 530 and microcontroller regulator 540 are configured to control flow aspects of both centrifugal-type pump 510 and piston-type pump 520, preferably independently or each other, so as to enable differential flow rates, pressure settings, pulsatile intensity and frequency, etc. Centrifugal-type pump 510 is suitable to provide a venous flow rate (e.g., in venous flow path 150), as typical centrifugal-type pumps are not configured to generate a pulsatile flow, as is needed for simulated arterial flow paths (e.g., arterial flow path 130). However, a separate oscillatory/pulsatile device may be placed in line with a centrifugal-type pump in order to provide a pulsatile flow rate suitable for use in an arterial flow path. Piston-type pump 520 is suitable to provide a simulated arterial flow rate, having pulsatile flow aspects (e.g., pulsatile intensity and/or pulsatile frequency), which can be controlled via microcontroller regulator 540, using commands received from user input controls 530.

Figure 7B:
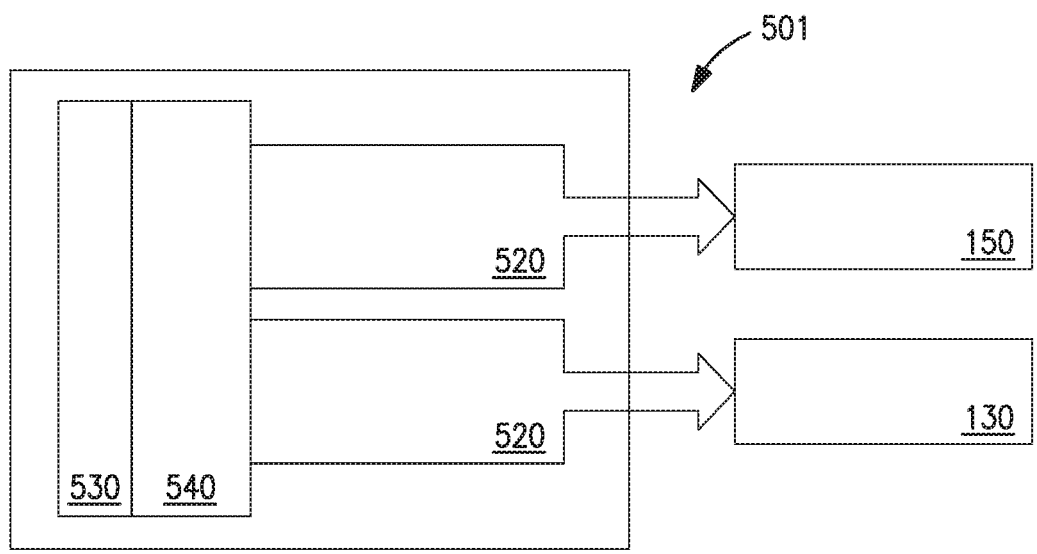
FIG. 7B is a schematic illustration of a second example embodiment of a pump control system for the peripheral cannulation simulator systems of FIGS. 1A and 1B, in accordance with the disclosure herein.

In FIG. 7B, pump control system 500 is illustrated, which is largely similar to pump control system 500, but using two piston-type pumps 520 to provide a simulated blood flow for both arterial flow path 130 and venous flow path 150. Piston-type pumps 520 are each separately and independently controlled by one or more microcontroller regulators 540, which receive user inputs regarding one or more flow aspects from user input controls 530.

Figure 7C:
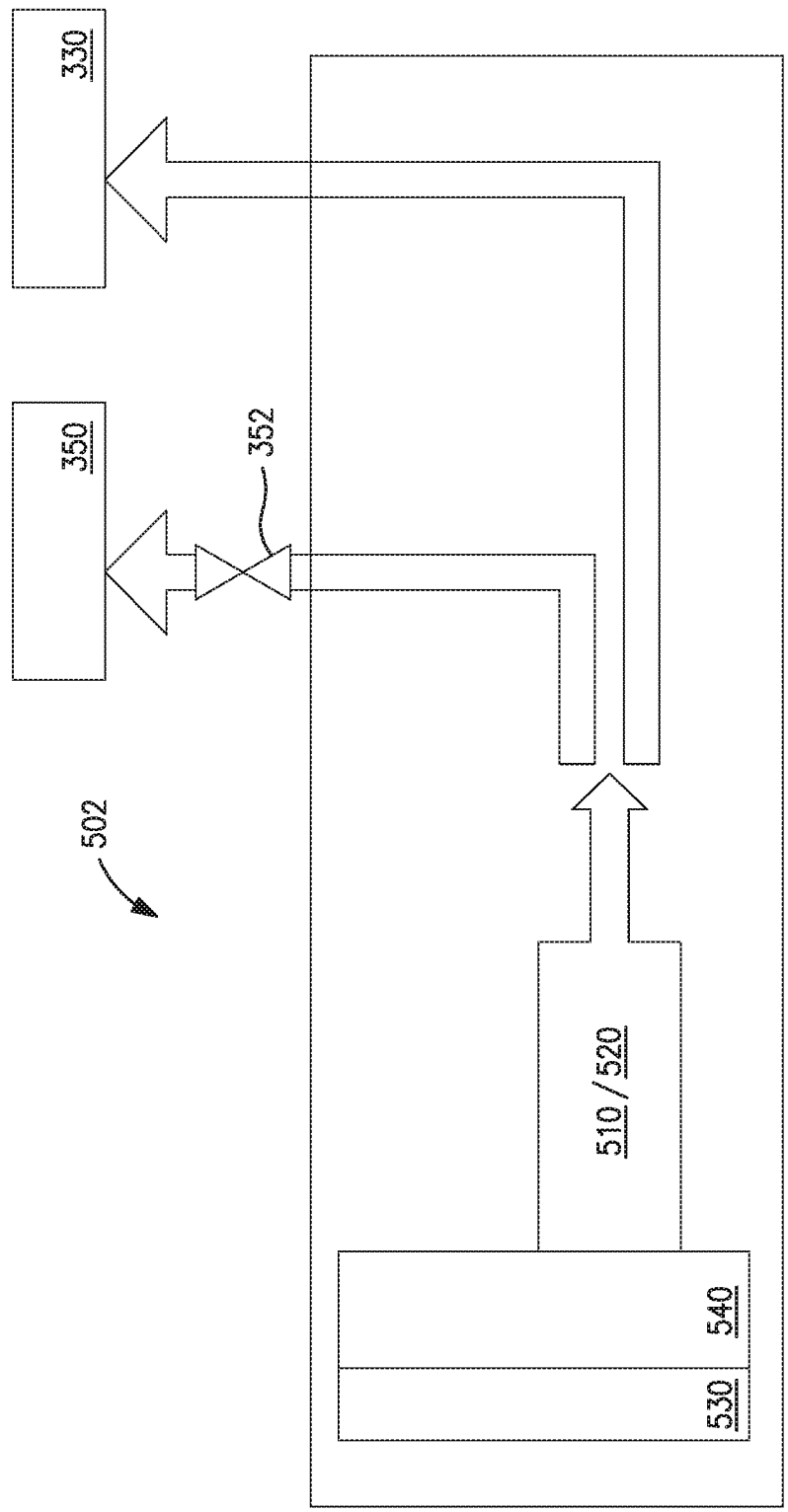
FIG. 7C is a schematic illustration of a first example embodiment of a pump control system for the peripheral cannulation simulator systems of FIGS. 5A and 5B, in accordance with the disclosure herein.

In FIG. 7C, pump control system 502 is illustrated, having a common pump for providing simulated blood flow for arterial flow path 330 and venous flow path 350. The common pump may be either a centrifugal-type pump 510 or a piston-type pump 520, but it is preferred to use a piston-type pump 520. Pump 510/520 is controlled by one or more microcontroller regulators 540, which receive user inputs regarding one or more flow aspects from user input controls 530. Pump 510/520 is connected to and configured to provide a simulated blood flow for arterial flow path 330 and venous flow path 350. Because arterial flow path 330 needs to operate at higher pressures and in a pulsatile manner, in order to provide the most realistic simulation experience, a pressure reducing valve 352 is inserted in-line with venous flow path 350, valve 352 being configured to reduce the pressure and/or pulsatile aspects of the simulated blood flow therethrough.

Figure 7D:
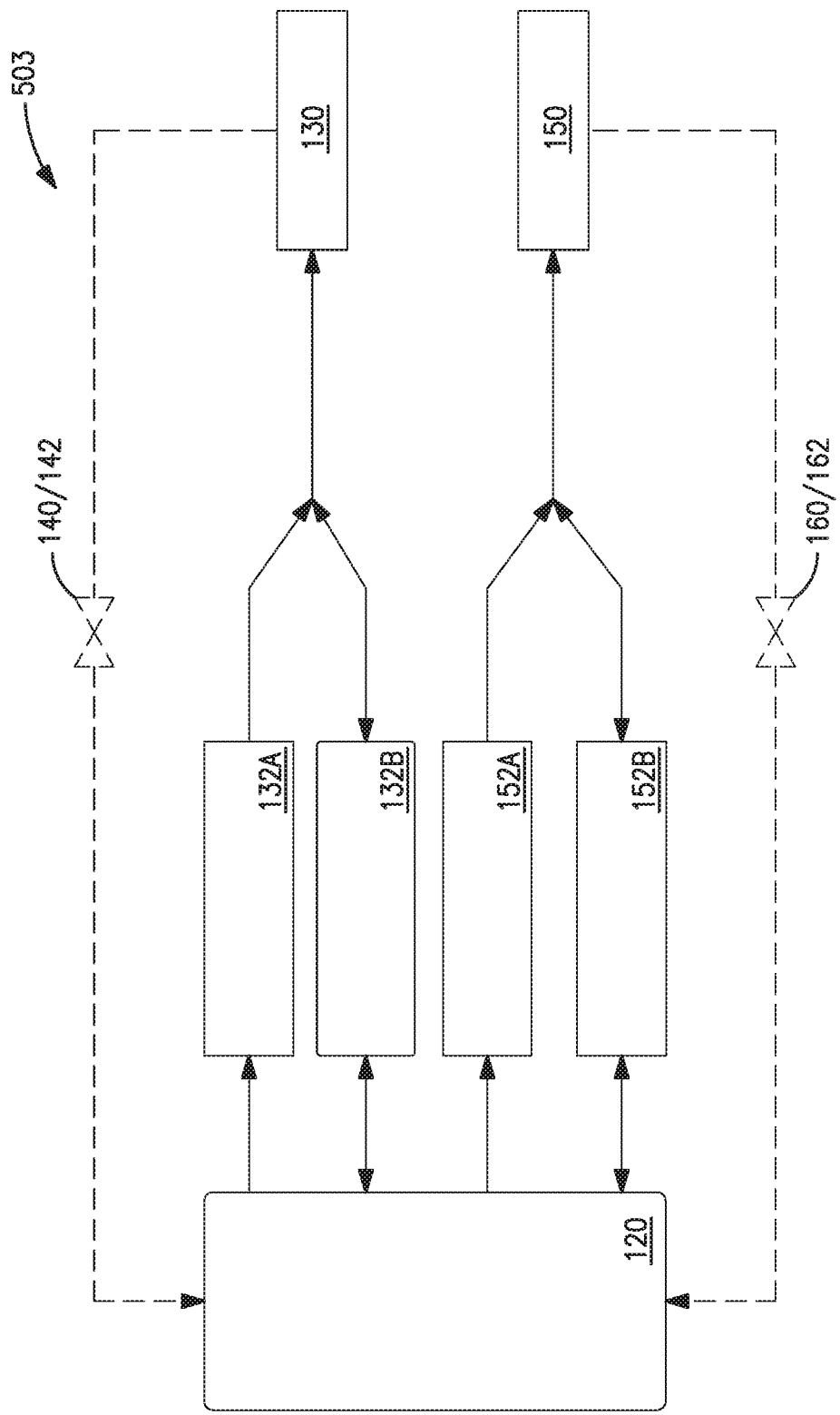
FIG. 7D is a schematic illustration of a third example embodiment of a pump control system for the peripheral cannulation simulator systems of FIGS. 1A and 1B, in accordance with the disclosure herein.

In FIG. 7D, a pump system, generally designated 503, having four pumps is illustrated schematically. These pumps are shown schematically being connected to arterial flow path 130 and venous flow path 150. Pump system 503 is capable of being applied to any of the embodiments of a simulator system as have been described hereinabove, including those which are not expressly recited, but would be readily understood to be within the scope of the subject matter of the invention by those having ordinary skill in the art. In pump system 503, there are two arterial pumps, a primary arterial pump 132A and a trim arterial pump 132B, and two venous pumps, a primary venous pump 152A and a trim venous pump 152B. Primary and trim arterial pumps 132A and 132B are configured to provide fluid from reservoir 120 to arterial flow path 130, with the fluid passing therethrough being returned to reservoir 120 after passing through carotid and/or femoral artery return valves 140 and 142. Primary and trim venous pumps 152A and 152B are configured to provide fluid from reservoir 120 to venous flow path 150, with the fluid passing therethrough being returned to reservoir 120 after passing through internal jugular and/or femoral vein return valves 160 and 162. Primary arterial pump 132A and primary venous pump 152A are configured to operate in a substantially similar manner to each other, with each being configured to provide a main positive pressure for the fluid flow through the arterial and venous flow paths 130 and 150, respectively. Trim arterial pump 132B and trim venous pump 152B are also configured to operate in a substantially similar manner, but are used to control a pressure or alter a pulsatility of the fluid flow in arterial and venous flow paths 130 and 150, respectively. As such, trim arterial and venous pumps 132B and 152B are configured to both pump fluid into and out of the respective flow paths, as needed. This can be done, for example, in order to induce an artificial pulsatility within one or both flow paths, by providing a suction pressure thereto in order to lower a pressure therein. Trim arterial and venous pumps 132B and 152B are therefore configured to be operated in any suitable fashion and by any suitable controller, whether independently or in conjunction with each other, to alter the fluid flow within their respective flow paths. Each pump described hereinabove can be controlled independently of each other pump, or may be controlled in any other suitable manner, as would be understood by those having skill in the art.

Figure 7E:
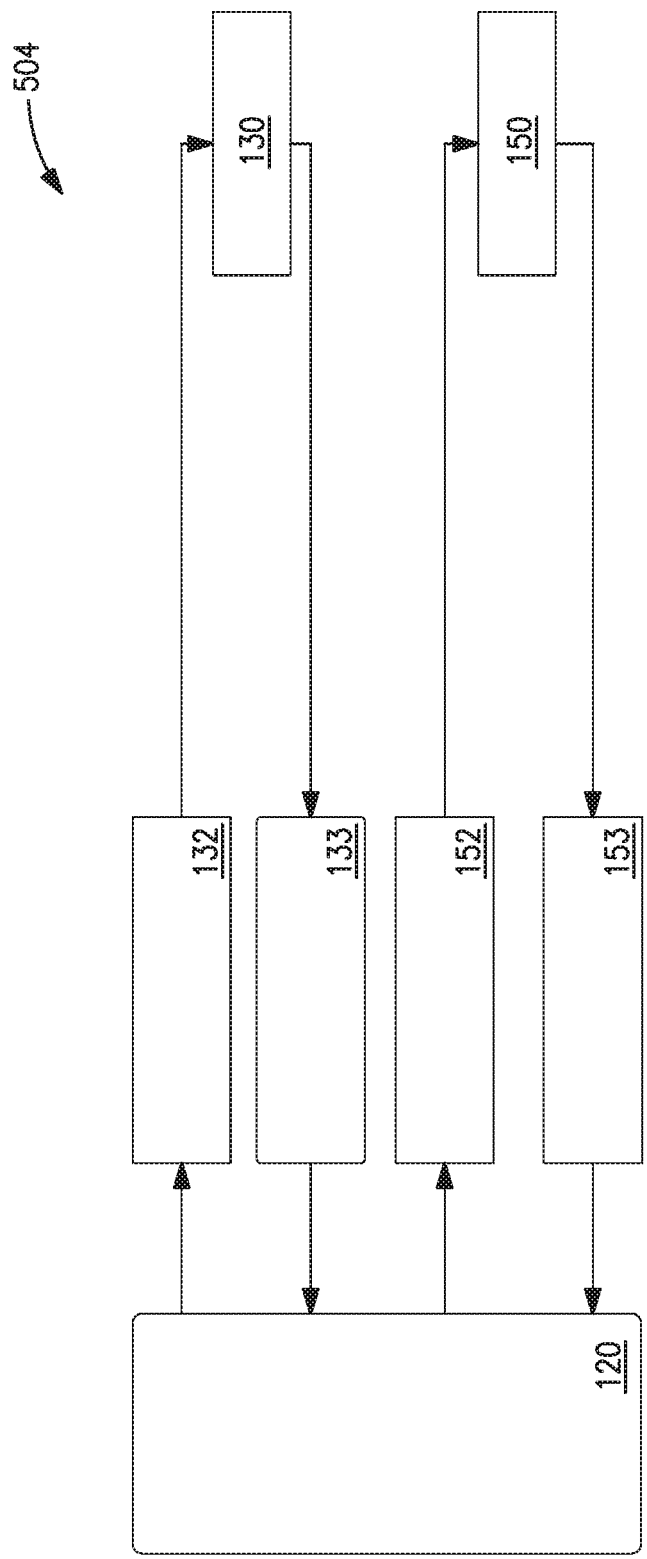
FIG. 7E is a schematic illustration of a fourth example embodiment of a pump control system for the peripheral cannulation simulator systems of FIGS. 1A and 1B, in accordance with the disclosure herein.

In FIG. 7E, a pump system, generally designated 504, having four pumps is illustrated schematically. These pumps are shown schematically being connected to arterial flow path 130 and venous flow path 150. Pump system 504 is capable of being applied to any of the embodiments of a simulator system as have been described hereinabove, including those which are not expressly recited, but would be readily understood to be within the scope of the subject matter of the invention by those having ordinary skill in the art. Just as in pump system 503, pump system 504 includes four pumps, two of which are shown being connected to arterial flow path 130, and another two of which are shown being connected to venous flow path 150. The two pumps for arterial flow path 130 are connected in series, with arterial pump 132 being connected to reservoir 120 in order to supply fluid therein to one or more inlets of arterial flow path 130. An arterial suction pump 133 is disposed on an outlet of arterial flow path 130, providing a negative pressure in order to maintain a constant flow rate and pressure throughout arterial flow path 130. The two pumps for venous flow path 150 are connected in series, with venous pump 152 being connected to reservoir 120 in order to supply fluid therein to one or more inlets of venous flow path 150. A venous suction pump 153 is disposed on an outlet of venous flow path 150, providing a negative pressure in order to maintain a constant flow rate and pressure throughout venous flow path 150. Each pump described hereinabove can be controlled independently of each other pump, or may be controlled in any other suitable manner, as would be understood by those having skill in the art.

Figure 8A:
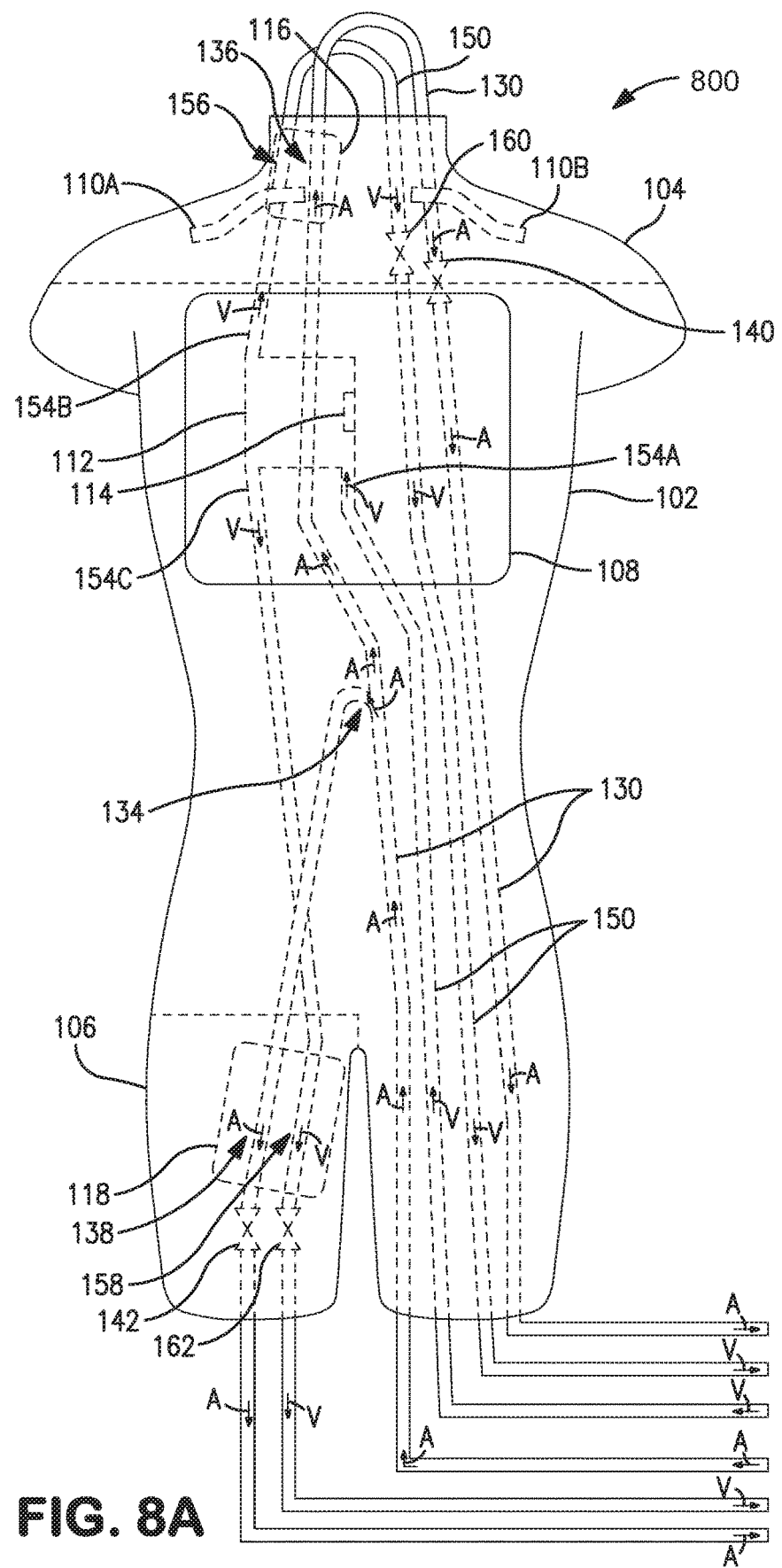
FIG. 8A is an external top plan view of a peripheral cannulation simulator system according to a first example embodiment, but in a second configuration, in accordance with the disclosure herein.
Figure 8B:
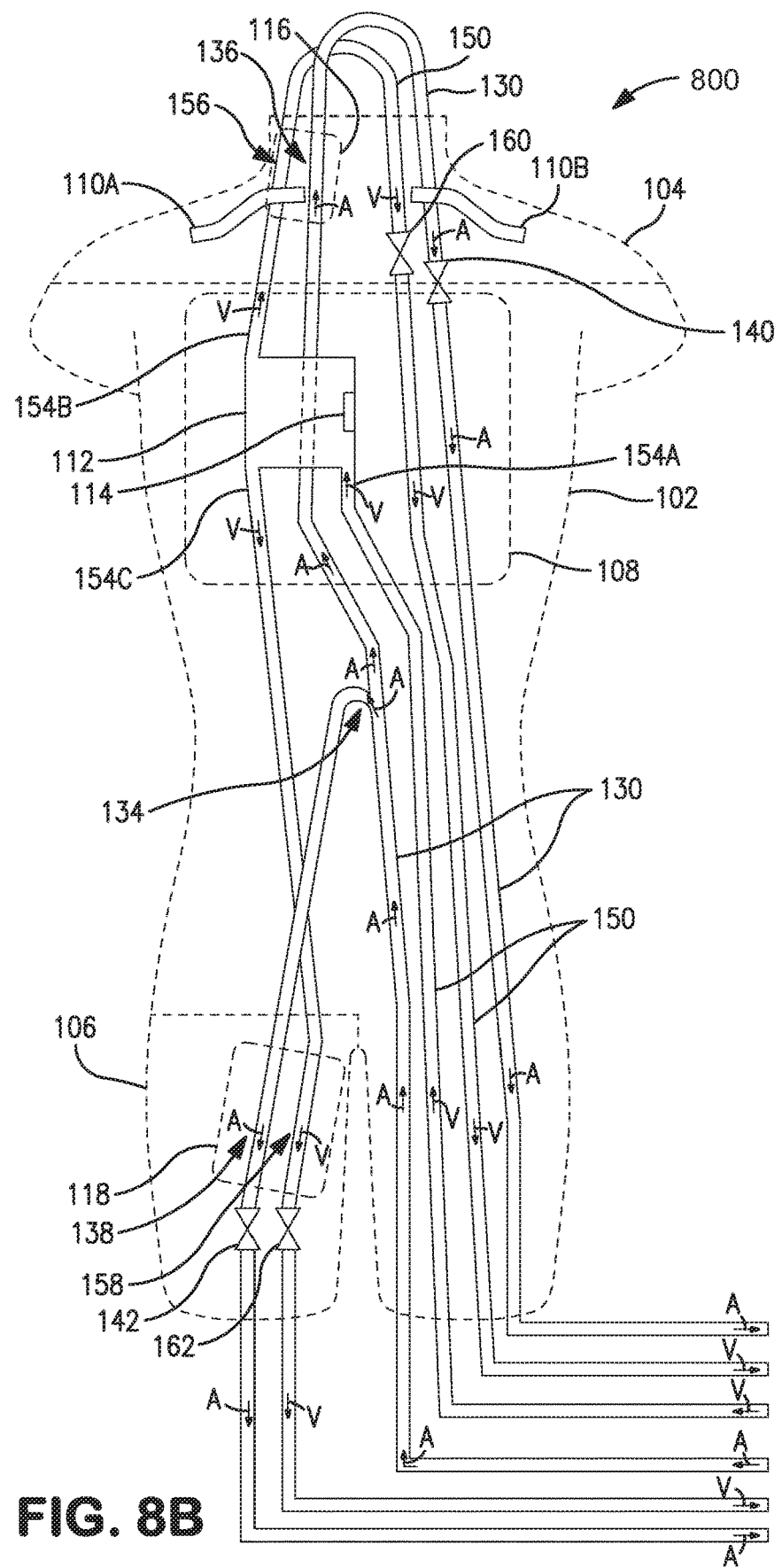
FIG. 8B is an internal top plan view of the peripheral cannulation simulator system of FIG. 8A, in accordance with the disclosure herein.

Referring now to FIGS. 8A and 8B, a simulator device, generally designated 800, is illustrated as being substantially similar to that illustrated in FIGS. 1A and 1B, but without any pumps or reservoirs being connected thereto. Device 800 illustrated in FIGS. 8A and 8B has identical flow paths as in system 100, but the inlets and outlets of arterial and venous flow paths 130 and 150 are configured to be connected (e.g., by quick connect devices) to an external control system, such as an extracorporeal membrane oxygenation (ECMO) system. Software executed on the ECMO system may then be utilized to automatically control the various flow aspects (e.g., flow rate, pressure, pulsatile intensity, pulsatile frequency, etc.) of arterial and venous flow paths 130 and 150, which may be controlled independent of one other or in concert. This feature allows for advanced simulation scenarios to be conducted in a repeatable and scientific fashion. One example of such a simulation scenario would be to train a user of device 800 how to respond when, during a normal medical procedure, a patient suffers a medical emergency (e.g., cardiac arrest). Such training scenarios may prove vital in improving patient mortality by providing an environment free of consequences for patients in which various techniques can be evaluated by trainees and experienced surgeons alike.

Figure 9:
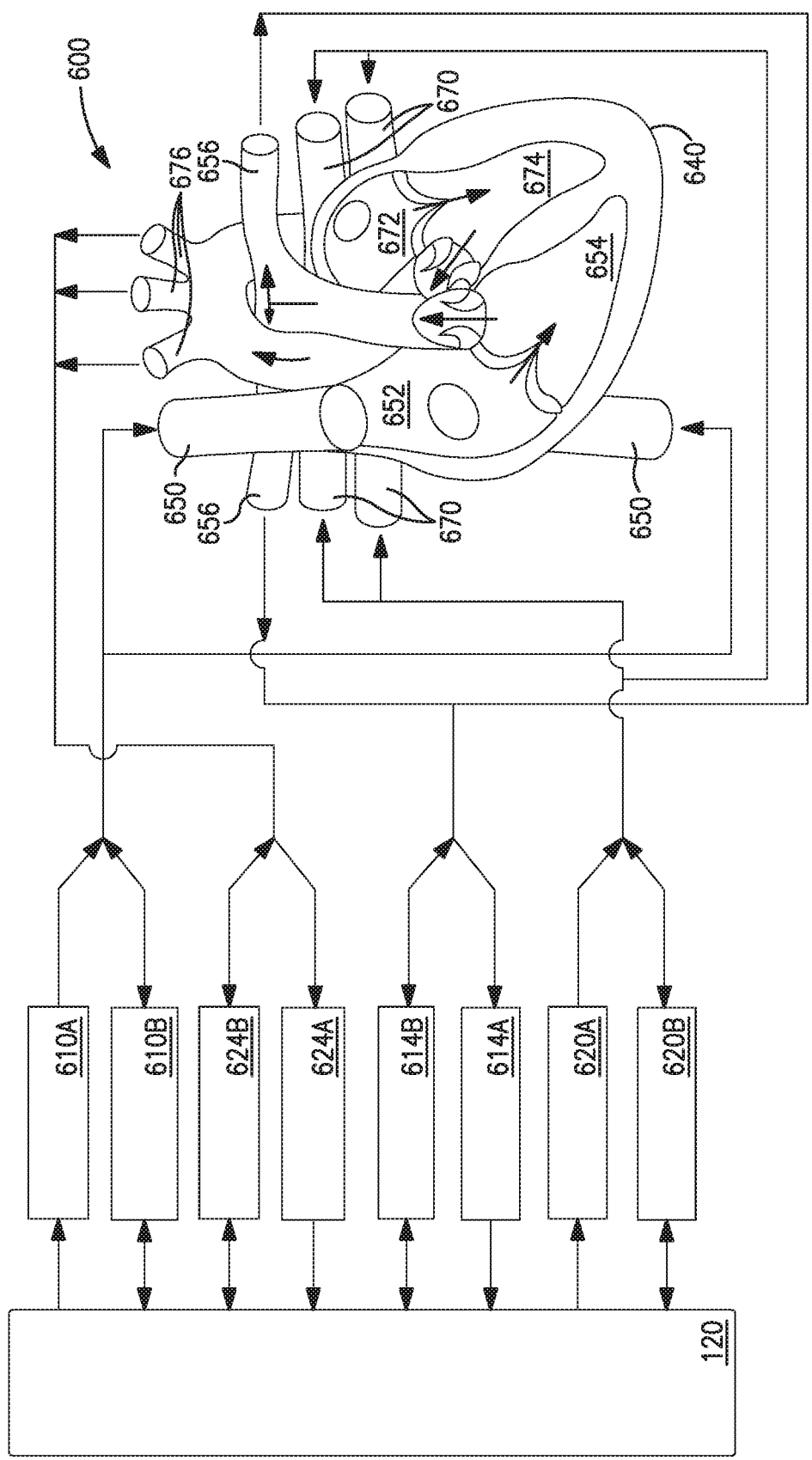
FIG. 9 is a schematic illustration of an example embodiment of a pump control system and flow path for a simulator system having a complete human heart structure, in accordance with the disclosure herein.

Continuing on to FIG. 9, an example embodiment of a pump control system 600 and flow path for a simulator system having a complete human heart 640 is illustrated schematically. Pump system 600 is capable of being applied to any of the embodiments of a simulator system as have been described hereinabove, including those which are not expressly recited, but would be readily understood to be within the scope of the subject matter of the invention by those having ordinary skill in the art. In pump system 600, a total of eight pumps are included therein, four of which are allocated to provide fluid along a first flow path, and four of which are allocated to provide fluid along a second flow path. Both first and second flow paths are illustrated as being supplied with fluid from reservoir 620, however fluid can be provided from another source without deviating from the scope of the inventive subject matter.

Along the first flow path of system 600, a first supply pump 610A and a first supply trim pump 610B pump fluid from reservoir 120, into right atrium inlet 650, which is analogous to the inferior vena cava and superior vena cava, and into right atrium 652; from right atrium 652, the fluid flows into right ventricle 654 and out of right ventricle outlet 656, which is analogous to the pulmonary arteries; the fluid then is returned to reservoir 120 by first return primary pump 614A and first return trim pump 614B.

Along the second flow path of system 600, a second supply pump 620A and a second supply trim pump 620B pump fluid from reservoir 120, into left atrium inlet 670, which is analogous to the pulmonary veins, and into left atrium 672; from left atrium 672, the fluid flows into left ventricle 674 and out of left ventricle outlet 676, which are connected to and receive fluid from the simulated aorta; the fluid then is returned to reservoir 120 by second return primary pump 624A and second return trim pump 624B.

Just as was described relative to pump system 503 in FIG. 7D, the first and second supply and return primary pumps (e.g., 610A, 614A, 620A, and 624A) are primarily responsible for applying positive and negative pressures within the first and second flow paths, whereas the first and second supply and return trim pumps (e.g., 610B, 614B, 620B, and 624B) are configured to both pump fluid into and out of the respective flow paths, as needed. This can be done, for example, in order to induce an artificial pulsatility within one or both flow paths, by providing a suction pressure thereto in order to lower a pressure therein. These trim pumps (e.g., 610A, 614A, 620A, and 624A) are therefore configured to be operated in any suitable fashion and by any suitable controller, whether independently or in conjunction with each other, to alter the fluid flow within their respective flow paths. Each pump described hereinabove can be controlled independently of each other pump, or may be controlled in any other suitable manner, as would be understood by those having skill in the art.

According to another aspect of the invention, a method of simulating insertion of a medical device into a heart atrium is provided, the method comprising using a simulator system according to any of the four embodiments described hereinabove. According to this method, a simulated blood flow is provided to both a simulated venous flow path and an arterial flow path, with the fluid of the arterial flow path preferably being pulsatile and having higher pressure than the fluid in the venous flow path. A device configured for insertion via cannulation, and preferably via cannulation using the Seldinger technique, and/or a percutaneously inserted device is then inserted into the venous flow path and/or the arterial flow path in the neck cannulation region and/or the femoral cannulation region. In some embodiments, the device is configured to inject a fluid having a color or other observable characteristic different from the simulated blood fluid, thereby allowing for a visualization or contrast of a change in the flow patterns caused by inserting the device.

The insertion into the desired section of vasculature of the device can be aided by various imaging techniques, including being guided by ultrasound imaging techniques, and preferably by using Doppler ultrasound imaging techniques. Where it is desired to simulate the insertion of devices into the superior vena cava, the device is inserted into the simulated venous flow path at the internal jugular vein cannulation site at the silicone upper torso. Where it is desired to simulate the insertion of devices into the inferior vena cava, the device is inserted into the simulated venous flow path at the femoral vein cannulation site at the silicone right groin. From the respective cannulation site, the device is inserted through the venous flow path towards and into the atrium, which has a front surface having a translucent material (e.g., plastic). The top surface of the atrium translucent to allow for easy visualization of flow dynamics during the use of medical catheters, medical devices, or mechanical circulatory support devices, particularly when colored fluids, or perhaps fluids of variable densities are used to make streaming effects and flow patterns visible. During and after insertion, the devices may be viewed via a translucent "atrium" within the chest of the simulator in order to facilitate teaching and learning of proper device insertion and positioning, as well as to visualize flow dynamics (e.g., if colored fluid or otherwise labeled fluid was used) and the entrainment of air during the use of mechanical circulatory support devices.

The portion of venous flow path (e.g., venous flow path 150) used to simulate the superior vena cava (SVC) is connected to atrium 112 using a watertight, hollow connector (e.g., upper atrium outlet port 154B). The connector prevents leakage of fluid from venous flow path 150. The connector has a circular hole that allows a wire or cannula to pass through it from the tubing into the clear box. A substantially similar watertight, hollow connector is used to simulate the connection of the inferior vena cava (IVC) to atrium 112 at lower atrium outlet port 154C. Because both connectors at upper and lower atrium outlet ports 154B and 154C are internally hollow, it is possible to place a wire (or other device) using standard percutaneous needle access techniques, into the lumen of the vessel, pass a wire from inside the lumen of the tubing in the neck portion of upper torso 104, through upper atrium outlet port 154B, into atrium 112, down through lower atrium outlet port 154C, and through venous flow path 150 into right groin 106 of the simulator. Similarly, the wire or device could be placed percutaneously into venous flow path 150 at femoral vein cannulation site of right groin 106, and passed in the opposite direction (e.g., through lower atrium outlet port 154C, atrium 112, through the upper atrium outlet port, and into the simulated SVC). A purpose of this design is to simulate the flow path of the internal vasculature comprising the right internal jugular vein, the superior vena cava, the right atrium, the inferior vena cava, the iliac vein, and the right common femoral vein, thereby providing a continuous flow path from the right internal jugular vein to the right common femoral vein to allow for passage of such medical devices.

According to another aspect, the simulator may be configured to allow for training medical personnel concerning proper techniques associated with any endovascular device placement procedure, including those procedures involving the heart and aorta. Further, the tubing comprising the arterial flow path may be of a large size, in at least a portion thereof, in order to simulate the anatomy of an aorta. This simulated aorta may be visible to the user and/or any observers when the removable chest plate is removed, similar to the ability to view the atrium structure. The tubing used in the simulator may be translucent in order for a user of the simulator to be able to see the precise location of the inserted medical device within the vasculature as the training is occurring. For example, with translucent tubing, a user could visualize the endovascular device within the lumen. Additionally, the medical devices placed within the simulated aorta, as well as other locations within the simulator accessible to the user, may be palpated by the user by reaching within the model through the open chest plate, for example, for immediate tactile feedback on specific location of device placement.

Because the venous systems and arterial systems are connected, this simulator can be connected to mechanical support and used to achieve continuous, indefinite circulation within the simulator. The simulator allows for a functional interaction with other devices in a much more high-fidelity, working capacity. Furthermore, because of the access within the simulator, the simulator may be at least partially refurbished when the vasculature and/or silicone molds reach the end of their useful life.

It is contemplated that the nature of the connections of the tubing in this simulator allows for the simulator to be connected to a cardiopulmonary bypass circuit or other mechanical circulatory support pump system and to indefinitely circulate fluid within the vasculature, to the mechanical support system pump, and return to the vasculature via cannulae, thus simulating the proper use of the medical device as it might be used in a living person.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

The invention claimed is:

1. A simulator system comprising:
   a shell comprising a removable chest plate;
   at least one reservoir filled with a fluid;
   at least one pump;
   a venous flow path in fluid communication with the at least one pump;
   an arterial flow path in fluid communication with the at least one pump; and
   an atrium comprising a translucent front wall that is flat, the atrium being in fluid communication with at least the venous flow path.

2. The system of claim 1, wherein the shell is in a shape of an adult or juvenile human.

3. The system of claim 2, wherein:
   the shell has an upper torso and a right groin;
   the upper torso is filled with a silicone material; and
   the upper torso and/or right groin comprise anatomically correct landmarks.

4. The system of claim 3, wherein the upper torso and/or the right groin are configured to simulate burned and/or otherwise injured human tissue.

5. The system of claim 3, wherein the anatomically correct landmarks comprise one or more clavicles embedded in the upper torso.

6. The system of claim 5, wherein:
   the atrium comprises a simulated tricuspid valve on a left wall of the atrium;
   the venous flow path and the arterial flow path each comprise flexible and distensible tubing;
   a first portion of the venous flow path is embedded, at least partially, within the silicone material of the upper torso and/or a second portion of the venous flow path is embedded, at least partially, within the silicone material of the right groin;

the first portion of the venous flow path passes underneath the one or more clavicles and through a neck cannulation region of the upper torso;

the second portion of the venous flow path passes through a femoral cannulation region, the first and second portions of the venous flow path are in fluid communication with a third portion of the venous flow path; and the first, second, and third portions of the venous flow path are connected to a respective port of the atrium.

7. The system of claim 6, wherein:

the atrium is in a shape of a rectangular prism; or the atrium is in a shape of a triangular prism with the translucent front wall in a shape of a triangle.

8. The system of claim 6, wherein:

the arterial flow path comprises a first portion, which is bifurcated from a second portion at an arterial bifurcation point;

the first portion passes through a neck cannulation region in the upper torso; and the second portion passes through a femoral cannulation region in the right groin.

9. The system of claim 8, wherein:

the first portion of the venous flow path is located in a lateral position, relative to the first portion of the arterial flow path, in the neck cannulation region; and the second portion of the venous flow path is located in a medial position, relative to the second portion of the arterial flow path, in the femoral cannulation region.

10. The system of claim 6, wherein:

the arterial flow path comprises one or more arterial valves configured to regulate a pressure of the fluid in the arterial flow path; and the venous flow path comprises one or more venous valves configured to regulate a pressure of the fluid in the venous flow path.

11. The system of claim 6, wherein the system is configured such that a device configured to be inserted via cannulation can travel within the venous flow path from the first portion of the venous flow path at the neck cannulation region to the second portion of the venous flow path at the femoral cannulation region by passing through the atrium.

12. The system of claim 6, wherein the first portion of the venous flow path, the second portion of the venous flow path, the first portion of the arterial flow path, and/or the second flow path of the arterial flow path are located at a anatomically accurate depth in the neck cannulation region and/or the femoral cannulation region.

13. The system of claim 6, wherein the first portion of the venous flow path, the second portion of the venous flow path, the first portion of the arterial flow path, and/or the second flow path of the arterial flow path appear differently using an imaging technique, preferably an ultrasound imaging technique.

14. The system of claim 1, wherein the fluid is a simulated blood.

15. The system of claim 14, wherein the fluid comprises a different color from a fluid provided in or by a device configured to be inserted via cannulation, thereby allowing a visualization or contrast of a change in flow patterns caused by an insertion of the device into the atrium, the venous flow path, and/or the arterial flow path.

16. The system of claim 1, wherein the venous flow path and the arterial flow path are configured to be pierced to allow insertion of a device, which is configured to be inserted via cannulation, and/or a percutaneously inserted device.

17. The system of claim 1, wherein the at least one pump comprises a common arterial/venous pump configured to provide a fluid flow through the arterial and venous flow paths.

18. The system of claim 17, comprising a venous pressure reducing valve in the venous flow path, after the venous and arterial flow paths split at an arterial/venous bifurcation point.

19. The system of claim 1, wherein the at least one pump comprises a venous pump and an arterial pump, wherein the venous pump is configured to provide the fluid from the at least one reservoir to the venous flow path, and wherein the arterial pump is configured to provide the fluid from the at least one reservoir to the arterial flow path.

20. The system of claim 19, wherein the arterial pump is a piston-type pump configured to provide a pulsatile aspect to the fluid in the arterial flow path and the venous pump is a centrifugal-type pump.

21. The system of claim 20, wherein the venous flow path and/or the arterial flow path are configured to be detected and identified via manual palpation by a user of the system in at least the neck cannulation region and/or the femoral cannulation region.

22. The system of claim 20, comprising one or more user input controls and at least one microcontroller regulator, wherein the one or more user input controls are electrically connected to the at least one microcontroller regulator, and wherein the at least one microcontroller regulator is electrically connected to the arterial pump and/or the venous pump.

23. The system of claim 22, wherein:

the user input controls are configured to allow a user of the system to select a flow rate, a pressure, a pulsatile intensity, and a pulsatile frequency for the fluid in the arterial flow path and/or the fluid in the venous flow path; and the at least one microcontroller regulator is configured to control the flow rate, the pressure, the pulsatile intensity, and/or the pulsatile frequency for the arterial flow path independently from the flow rate, the pressure, the pulsatile intensity, and/or the pulsatile frequency for the venous flow path.

24. The system of claim 1, wherein the at least one pump comprises:

an arterial primary pump;

an arterial trim pump;

a venous primary pump; and a venous trim pump;

wherein the arterial primary and trim pumps are in fluid communication with the reservoir and the arterial flow path and are configured to provide fluid from the reservoir to the arterial flow path;

wherein the venous primary and trim pumps are in fluid communication with the reservoir and the venous flow path and are configured to provide fluid from the reservoir to the venous flow path; and wherein the arterial and venous primary pumps are configured to provide a primary fluid flow to the arterial and venous flow paths, respectively, while the arterial and venous trim pumps are configured to modulate the primary fluid flow by adding or withdrawing fluid therefrom.

25. The system of claim 1, wherein the at least one pump comprises:

an arterial supply pump;
an arterial return pump;
a venous supply pump; and
a venous return pump;
wherein the arterial supply pump is configured to supply the fluid from reservoir to the arterial flow path at a positive pressure;
wherein the arterial return pump is configured to return the fluid to the reservoir from the arterial flow path by applying a negative pressure to the arterial flow path;
wherein the venous supply pump is configured to supply the fluid from reservoir to the venous flow path at a positive pressure; and
wherein the venous return pump is configured to return the fluid to the reservoir from the venous flow path by applying a negative pressure to the venous flow path.

26. A peripheral cannulation simulator system comprising:
a shell in a shape of an adult or juvenile human, wherein the shell comprises a removable chest plate, an upper torso, and a right groin, and wherein the upper torso and right groin are filled with a silicone material and comprise anatomically correct landmarks embedded therein, including at least one clavicle;
at least one reservoir filled with a fluid;
at least one pump;
a venous flow path comprising flexible and distensible tubing in fluid communication with the at least one pump and one or more venous valves configured to regulate a pressure of the fluid in the venous flow path, wherein:
a first portion of the venous flow path is embedded, at least partially, within the silicone material of the upper torso and/or a second portion of the venous flow path is embedded, at least partially, within the silicone material of the right groin;
the first portion of the venous flow path passes underneath the one or more clavicles and through a neck cannulation region of the upper torso;
the second portion of the venous flow path passes through a femoral cannulation region; and
the first and second portions of the venous flow path are in fluid communication with a third portion of the venous flow path;
an arterial flow path comprising flexible and distensible tubing in fluid communication with the at least one pump and one or more arterial valves configured to regulate a pressure of the fluid in the arterial flow path, wherein:
the arterial flow path comprises a first portion, which is bifurcated from a second portion at an arterial bifurcation point;
the first portion passes through a neck cannulation region in the upper torso; and
the second portion passes through a femoral cannulation region in the right groin; and
an atrium in fluid communication with at least the venous flow path, wherein the atrium comprises a simulated tricuspid valve on a left wall thereof, comprises a translucent front wall that is flat, and is in a shape of a rectangular prism with the front wall in a shape of a square, a triangular prism with the front wall in a shape of a triangle;
wherein the first portion of the venous flow path is located in a lateral position, relative to the first portion of the arterial flow path, in the neck cannulation region;
wherein the second portion of the venous flow path is located in a medial position, relative to the second portion of the arterial flow path, in the femoral cannulation region; and
the first, second, and third portions of the venous flow path are connected to a respective port of the atrium.

27. A peripheral cannulation simulator device comprising:
a shell comprising a removable chest plate;
at least one reservoir filled with a fluid, wherein the reservoir is an external fluid source;
a venous flow path configured to be connected to the external fluid source;
an arterial flow path configured to be connected to the external fluid source; and
an atrium comprising a translucent front wall that is flat, the atrium being in fluid communication with at least the venous flow path.

* * * * *